US012151467B2

(12) United States Patent
Kobayashi

(10) Patent No.: US 12,151,467 B2
(45) Date of Patent: Nov. 26, 2024

(54) PRINTING DEVICE

(71) Applicant: SEIKO EPSON CORPORATION, Tokyo (JP)

(72) Inventor: Satoru Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 77 days.

(21) Appl. No.: 17/934,603

(22) Filed: Sep. 23, 2022

(65) Prior Publication Data

US 2023/0106200 A1 Apr. 6, 2023

(30) Foreign Application Priority Data

Sep. 27, 2021 (JP) ................................ 2021-156410

(51) Int. Cl.
*B41J 11/42* (2006.01)
*B41J 29/377* (2006.01)

(52) U.S. Cl.
CPC ............ *B41J 11/42* (2013.01); *B41J 29/377* (2013.01)

(58) Field of Classification Search
CPC ................................ B41J 11/42; B41J 29/377
See application file for complete search history.

(56) References Cited

U.S. PATENT DOCUMENTS

2001/0040690 A1* 11/2001 Terajima ............. H04N 1/2338 358/468

FOREIGN PATENT DOCUMENTS

JP 2014-098215 A 5/2014

* cited by examiner

*Primary Examiner* — Justin Seo
(74) *Attorney, Agent, or Firm* — WORKMAN NYDEGGER

(57) ABSTRACT

A printing device includes a liquid ejecting unit configured to eject a liquid and perform printing on fiber to be transported, and a supply flow path for supplying a liquid accommodated in a liquid accommodating body to the liquid ejecting unit. Furthermore, the printing device includes a selection unit configured to enable a user to select a finished state of the printed fiber in advance, and a control unit. The control unit is configured to control a control target so as to match a condition corresponding to the finished state specified by the selection unit.

11 Claims, 9 Drawing Sheets

RD

| | | | | |
|---|---|---|---|---|
| (a) | PARAMETERS | LIQUID TEMPERATURE IN SUPPLY FLOW PATH | LOW | HIGH |
| | FINISHED STATE | TEXTURE | HARD | SOFT |
| | | COLORATION | DARK | LIGHT |
| (b) | PARAMETERS | TRANSPORT VELOCITY OF FIBER | SLOW | FAST |
| | FINISHED STATE | TEXTURE | SOFT | HARD |
| | | COLORATION | LIGHT | DARK |
| (c) | PARAMETERS | SURFACE TEMPERATURE OF TRANSPORT UNIT | LOW | HIGH |
| | FINISHED STATE | TEXTURE | HARD | SOFT |
| | | COLORATION | DARK | LIGHT |
| (d) | PARAMETERS | CARRIAGE MOVEMENT VELOCITY | SLOW | FAST |
| | FINISHED STATE | TEXTURE | SOFT | HARD |
| | | COLORATION | LIGHT | DARK |
| (e) | PARAMETERS | NUMBER OF PRINTING PASSES | FEW | MANY |
| | FINISHED STATE | TEXTURE | HARD | SOFT |
| | | COLORATION | DARK | LIGHT |
| (f) | PARAMETERS | EJECTED LIQUID VOLUME OF LIQUID EJECTING UNIT | FEW | MANY |
| | FINISHED STATE | TEXTURE | SOFT | HARD |
| | | COLORATION | LIGHT | DARK |
| (g) | PARAMETERS | LIQUID EJECTION VELOCITY OF LIQUID EJECTING UNIT | SLOW | FAST |
| | FINISHED STATE | TEXTURE | HARD | SOFT |
| | | COLORATION | DARK | LIGHT |

FIG. 7

PRINTING DEVICE

The present application is based on, and claims priority from JP Application Serial Number 2021-156410, filed Sep. 27, 2021, the disclosure of which is hereby incorporated by reference herein in its entirety.

BACKGROUND

1. Technical Field

The present disclosure relates to a printing device including a liquid ejecting unit configured to eject a liquid onto fiber.

2. Related Art

JP-A-2014-98215 discloses, as an example of this type of printing device, an inkjet-type printing device configured to eject a liquid such as ink onto fiber to perform printing on the fiber. This inkjet-type printing device includes a transport unit configured to transport the fiber, and a liquid ejecting unit configured to eject ink onto the fiber by an inkjet method.

In this type of printing device, even when printing is performed under the same printing conditions using the same type of liquid such as ink, a finished state of the fiber after printing changes according to a type of the fiber (fiber type), a state of the fiber such as a material, a thickness, or the like of the fiber, and the like. Therefore, to ensure that the finished state of the fiber after printing is a desired finished state, textile printing is performed by preparing a plurality of types of fiber differing in fiber type, fiber state, and the like.

However, the problem exists that many types of fiber are required to achieve differences in the finished state of the fiber after printing. Therefore, there is a demand for a printing device that can obtain different finished states even with one type of fiber.

SUMMARY

A printing device that solves the problems described above includes a liquid ejecting unit configured to eject a liquid and perform printing on fiber transported, a supply flow path for supplying a liquid accommodated in a liquid accommodating body to the liquid ejecting unit, a selection unit configured to enable a user to select a finished state of the printed fiber in advance, and a control unit configured to control a control target so as to match a condition corresponding to the finished state specified by the selection unit.

BRIEF DESCRIPTION OF THE DRAWINGS

FIG. 7 is a schematic view illustrating an overview of reference data.

DESCRIPTION OF EXEMPLARY EMBODIMENTS

First Exemplary Embodiment

A first exemplary embodiment of a printing device including a liquid ejecting unit will be described below with reference to the drawings. A printing device 11 according to the first exemplary embodiment is, for example, an inkjet-type printer configured to support fiber M on a transporting belt and eject ink, which is an example of a liquid, and perform printing on the fiber M.

Figure 1:
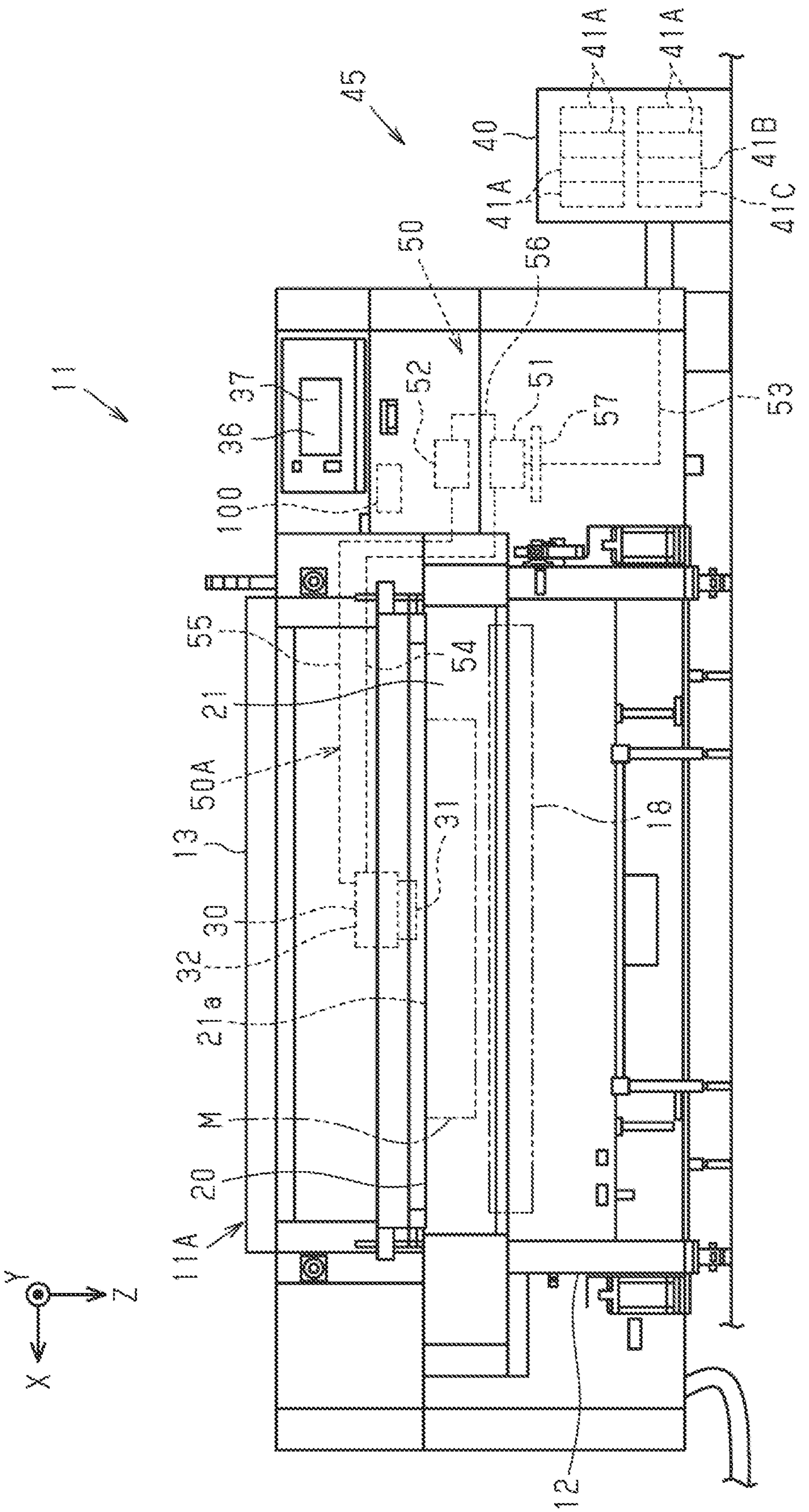
FIG. 1 is a front view of a printing device according to a first exemplary embodiment.

In FIG. 1, given that the printing device 11 is placed on a horizontal surface, a direction of gravity is indicated by a Z-axis, and directions along a horizontal plane are indicated by an X-axis and a Y-axis. The X-axis, the Y-axis, and the Z-axis are mutually orthogonal. In the description below, a direction along the X-axis is also referred to as a width direction X or a scanning direction X. Further, a direction along the Y-axis is also referred to as a depth direction Y, and a direction along the Z-axis is also referred to as a gravitational direction Z. In this case, a Y-axis direction is a direction in which the fiber M is transported in a printing position in which printing is performed on the fiber M, and thus is also referred to as a transport direction Y. When the transport direction Y and a direction opposite thereto are to be distinguished, the transport direction Y is referred to as a +Y direction and the direction opposite to the transport direction is referred to as a −Y direction.

Configuration of Printing Device 11

Figure 2:
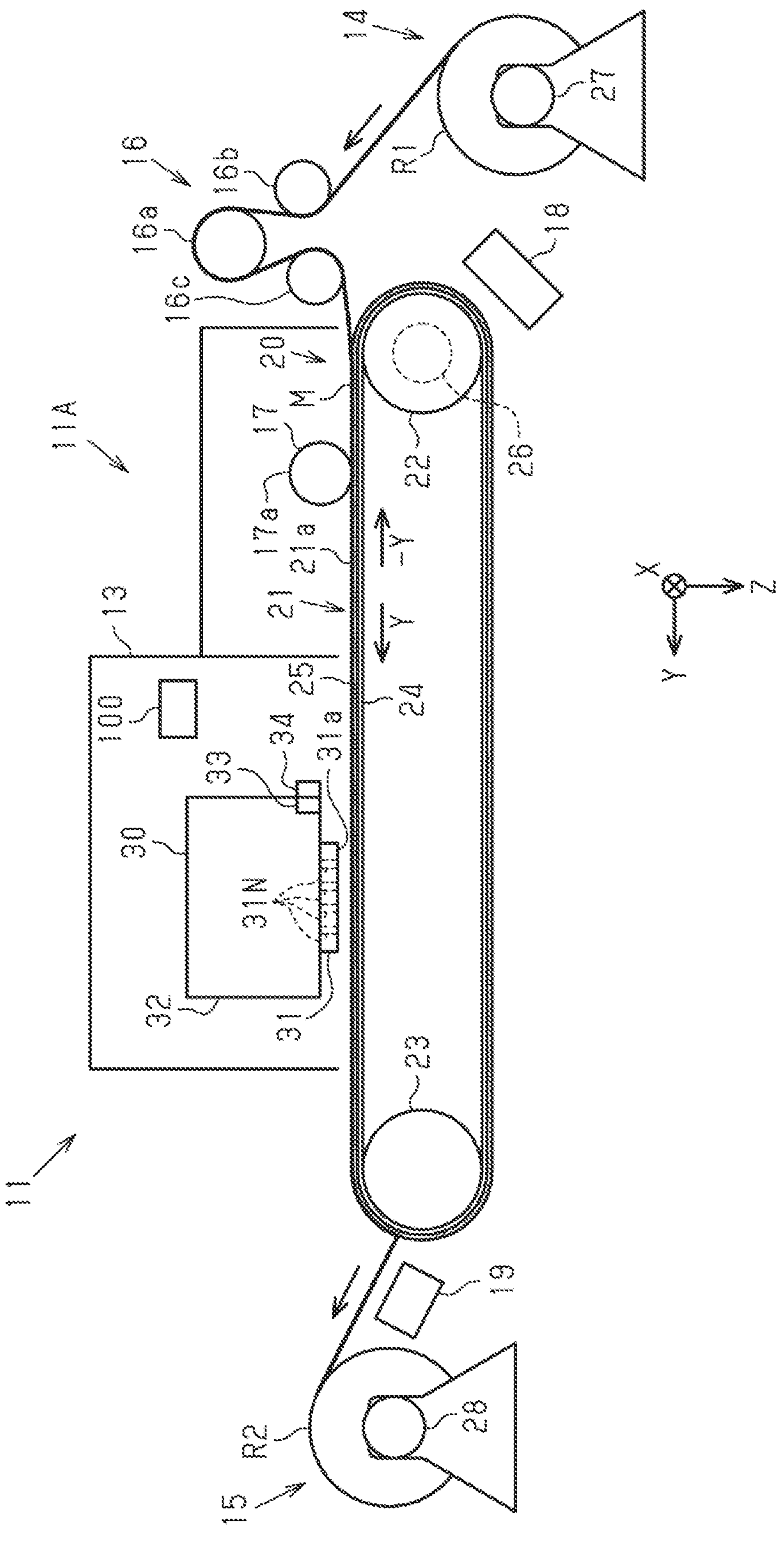
FIG. 2 is a schematic side sectional view illustrating the printing device.

A configuration of the printing device 11 will now be described with reference to FIG. 1 and FIG. 2. As illustrated in FIG. 1 and FIG. 2, the printing device 11 includes a transport unit 20 configured to transport the fiber M, and a printing unit 30 configured to perform printing on the fiber M to be transported. The printing unit 30 includes a liquid ejecting unit 31 that ejects a liquid and performs printing on the fiber M to be transported. The printing device 11 of this example is an inkjet printer in which the liquid ejecting unit 31 ejects ink, which is an example of the liquid.

As illustrated in FIG. 1 and FIG. 2, the printing device 11 may include a base 12 having a column-beam structure and a housing 13. The transport unit 20 and the liquid ejecting unit 31 are supported by the base 12. The housing 13 covers a scanning region that is a region where the liquid ejecting unit 31 moves in the scanning direction X during printing.

The transport unit 20 includes, for example, a transporting belt 21. The transporting belt 21 is a glue belt, for example. The transporting belt 21 includes a support face 21*a* capable of supporting the fiber M. The transporting belt 21 transports the fiber M by the movement of the support face 21*a*.

The liquid ejecting unit 31 ejects the liquid onto the fiber M supported by the transporting belt 21, thereby performing printing on the fiber M. The liquid ejecting unit 31 may be a serial-printing type illustrated in FIG. 1 and FIG. 2, or may be a line-printing type. The printing device 11, which is the serial-printing type illustrated in FIG. 1 and FIG. 2, includes a carriage 32, as an example of a moving unit, provided with the liquid ejecting unit 31 and movable in the scanning direction X. The liquid ejecting unit 31 is mounted on the carriage 32 illustrated in FIG. 1 and FIG. 2 in a posture facing the support face 21*a*.

The carriage 32 reciprocates in the scanning direction X parallel to the width direction X of the fiber M. The liquid ejecting unit 31 ejects liquid toward a front surface of the fiber M in a process of moving along with the carriage 32 in the scanning direction X. The printing device 11 prints an image or the like on the front surface of the fiber M by alternately performing a printing operation of one line performed by the liquid ejecting unit 31 ejecting liquid in the moving process, and a transport operation in which the transport unit 20 transports the fiber M to the next printing position.

Note that, when the liquid ejecting unit 31 is a line-printing type, the liquid ejecting unit 31 is constituted by a line head including a few nozzles capable of ejecting the liquid at once across an entire width direction of the fiber M transported by the transport unit 20. In the printing device 11, the liquid ejecting unit 31 that is a line-printing type prints an image or the like on the front surface of the fiber M by ejecting the liquid toward the front surface of the fiber M transported by the transport unit 20 at a predetermined transport velocity.

The printing device 11 includes a liquid supply unit 45 that supplies the liquid to the liquid ejecting unit 31. The liquid supply unit 45 includes liquid accommodating bodies 41A to 41C that accommodate liquids, and a supply flow path 50 for supplying the liquids in the liquid accommodating bodies 41A to 41C to the liquid ejecting unit 31. The liquid supply unit 45 may include a mounting portion 40 illustrated in FIG. 1, which is configured to enable a user to detachably mount the liquid accommodating bodies 41A to 41C.

The liquid accommodating bodies 41A to 41C are, for example, liquid cartridges or liquid tanks that accommodate liquids. The liquid accommodating bodies 41A to 41C accommodate the same liquids as the liquids ejected by the liquid ejecting unit 31. The liquid ejecting unit 31 ejects a plurality of types of liquids supplied from each of the liquid accommodating bodies 41A to 41C. Examples of the liquid include ink ejected for printing on the fiber M, a pretreatment liquid ejected for printing on the fiber M, or a post-treatment liquid.

The liquid accommodating unit 41A accommodates ink, which is an example of the liquid. As in the example illustrated in FIG. 1, a plurality of the liquid accommodating units 41A respectively accommodating ink of a plurality of colors may be provided. When the liquid ejecting unit 31 is configured to eject ink of a plurality of colors and perform color printing, the plurality of liquid accommodating bodies 41A respectively accommodate the ink of the colors used by the liquid ejecting unit 31 in color printing. For example, when the liquid ejecting unit 31 is configured to perform color printing with ink of N colors, N liquid accommodating bodies 41A that respectively accommodate the ink of N colors are provided.

When the N colors are four colors, four liquid accommodating bodies 41A respectively accommodate ink of the four colors of cyan, magenta, yellow, and black, for example. The color printing may be performed using the three colors of cyan, magenta, and yellow. Further, the N colors is not limited to four colors, and may be one color, two colors, or three colors, or may be five colors or more. For example, the configuration may be one in which one liquid accommodating body 41A that accommodates black ink is provided, and the liquid ejecting unit 31 ejects the ink onto the fiber M and performs monochrome printing (grayscale printing).

The liquid accommodating body 41B accommodates a pretreatment liquid, which is an example of the liquid. The liquid accommodating body 41B stores a resisting agent as an example of the pretreatment agent. A resisting agent prevents discoloration caused by staining.

The liquid accommodating body 41C accommodates a post-treatment liquid, which is an example of the liquid. The liquid accommodating body 41C stores a discharge printing agent as an example of the post-treatment agent. A discharge printing agent removes the color of the fiber M. Note that the liquid accommodating bodies 41A to 41C are each constituted by a cartridge or a tank.

The mounting portion 40 illustrated in FIG. 1 is configured as a separate body from the base 12 in FIG. 1, but may be integrally assembled with the base 12. The mounting portion 40 may, for example, be configured to expose the liquid accommodating bodies 41A to 41C in detachable states when an openable and closable cover (not illustrated) provided on the base 12 is opened.

In the example illustrated in FIG. 1, the liquid supply unit 45 may be configured to circulate the liquid supplied from the liquid accommodating bodies 41A to 41C through a path passing through the liquid ejecting unit 31. In this case, the supply flow path 50 may include a circulation flow path 50A that circulates the liquid through a path passing through the liquid ejecting unit 31.

As illustrated in FIG. 1, the supply flow path 50 includes a flow path 53 that supplies the liquid from each of the liquid accommodating bodies 41A to 41C to one sub-tank 51. For each of the liquid accommodating bodies 41A to 41C, the circulation flow path 50A includes two sub-tanks 51, 52 with the liquid accommodating bodies 41A to 41C as main tanks. The circulation flow path 50A includes a first flow path 54 that supplies the liquid from the sub-tank 51 to the liquid ejecting unit 31, a second flow path 55 that ejects the liquid from the liquid ejecting unit 31 to the sub-tank 52, and a third flow path 56 that circulates the liquid from the sub-tank 52 to the sub-tank 51.

The two sub-tanks 51, 52 temporarily store the liquid supplied from each of the liquid accommodating bodies 41A to 41C and circulated through the path passing through the liquid ejecting unit 31.

The liquid supplied from one sub-tank 51 to the liquid ejecting unit 31 is discharged to the other sub-tank 52 via a path passing through the liquid ejecting unit 31. Furthermore, the liquid is circulated from the other sub-tank 52 to the one sub-tank 51. Thus, the liquid supplied from each of the liquid accommodating bodies 41A to 41C is circulated, passing through the one sub-tank 51, the liquid ejecting unit 31, and the other sub-tank 52, in this order, and then returning once again to the one sub-tank 51.

The liquid supply unit 45 includes a first temperature adjustment unit 57 capable of adjusting the temperature of the liquid in the supply flow path 50. The first temperature adjustment unit 57 may adjust the temperature of the liquid at any position on the supply flow path 50. The first temperature adjustment unit 57 may adjust the temperature of the liquid in the circulation flow path 50A. Note that details of the liquid supply unit 45 will be described below.

As illustrated in FIG. 1, the printing device 11 includes an input operation unit 36 operable by the user, and a control unit 100 that controls the printing device 11. The printing device 11 may include a display unit 37 capable of displaying an input screen 90 (refer to FIG. 5) described below or the like for inputting a finished state.

The input operation unit 36 is configured to enable the user to select a finished state of the fiber M after printing. The input operation unit 36 may be constituted by the display unit 37 including a touch panel type screen, for example. Note that the input operation unit 36 need only be at least one of the display unit 37 that is a touch panel type and an operation button.

The control unit 100 controls a control target of the printing device 11 so that the fiber M after printing matches a desired finished state. The control unit 100 controls the transport unit 20 (specifically, a drive motor 26), the liquid ejecting unit 31, the first temperature adjustment unit 57, and the like. The first temperature adjustment unit 57 is one control target. The liquid ejecting unit 31 is one control target. Other control targets will be described below.

As illustrated in FIG. 2, the printing device 11 includes a feeding unit 14 for holding a roll body R1 on which the fiber M before printing is wound, and a winding unit 15 for winding the fiber M after printing. The printing device 11 may include a wrinkle suppressing device 16 that suppresses wrinkles in the fiber M in the middle of the fiber supply path from the feeding unit 14 to the transport unit 20. Further, the printing device 11 may also include a drying unit 19 configured to dry the fiber M after printing in the middle of a fiber discharge path from the transport unit 20 to the winding unit 15.

The feeding unit 14 includes a feeding motor 27 as a drive source thereof. The feeding unit 14 rotates in a direction in which the fiber M is unwound by the driving of the feeding motor 27. The feeding unit 14 supplies the fiber M before printing that is unwound from the roll body R1 by the driving of the feeding motor 27 to the transport unit 20.

The wrinkle suppressing device 16 suppresses wrinkles in the fiber M in the middle of the fiber supply path between the feeding unit 14 and the transport unit 20. The wrinkle suppressing device 16 includes a plurality of rollers 16*a* to 16*c*, each with an outer circumference around which the fiber M is wound. A stretching force applied to a portion of the fiber M wound around an outer circumferential surface of the roller 16*a* at a predetermined force suppresses the occurrence of wrinkles and removes wrinkles produced upstream of the roller 16*a*.

The winding unit 15 has a peeling function of peeling the fiber M after printing from the transporting belt 21. The winding unit 15 winds the fiber M after printing and after being peeled from the transporting belt 21 at a predetermined peel force to form a roll body R2. The winding unit 15 has a winding motor 28 as a drive source thereof.

The drying unit 19 heats the fiber M after printing, for example, thereby drying the fiber M after printing. The drying unit 19 may be a warm air type drying unit that blows warm air, or a heater type drying unit including a heating element (heater) that generates heat when energized. Note that the drying unit 19 along with the winding unit 15 may be a winding device constituting one device. Note that the winding unit 15 or the winding device may be a device separate from the printing device 11.

As illustrated in FIG. 2, the printing device 11 includes a pressing unit 17 that presses the fiber M against the support face 21*a* of the transporting belt 21 at a position upstream of the liquid ejecting unit 31 in the transport direction Y. The pressing unit 17 includes a pressure roller 17*a* that pressurizes the front surface of the fiber M. The pressure roller 17*a* reciprocates in the transport direction Y and the reverse transport direction −Y along the support face 21*a* while pressurizing the fiber M, thereby adhering the fiber M to an adhesive layer 25. The fiber M is supported while adhered to the support face 21*a* of the transporting belt 21.

The transport unit 20 includes the transporting belt 21, a driving roller 22, and a driven roller 23. The transporting belt 21 is wound around the driving roller 22 and the driven roller 23. The transporting belt 21 includes a substrate 24 that is endless and the adhesive layer 25 provided on an outer peripheral surface of the substrate 24. The adhesive layer 25 is formed by applying an adhesive to an entire periphery of the outer peripheral surface of the substrate 24. That is, the transporting belt 21 is a glue belt including the adhesive layer 25. The transporting belt 21 includes the support face 21*a* for supporting the fiber M on a front surface of the adhesive layer 25. The fiber M is supported on the support face 21*a* while adhered to the front surface of the adhesive layer 25. The adhesive layer 25 may be formed of a thermoplastic material that increases in adhesive strength by heating. Note that the adhesive layer 25 may be formed of a material that is less likely to change by heating and has the necessary adhesive force at room temperature.

The transport unit 20 includes the transport motor 26 as a drive source. The transport motor 26 is power-transferably coupled to the driving roller 22. When the transfer motor 26 is driven, the driving roller 22 rotates. When the driving roller 22 rotates, the transporting belt 21 revolves. The driven roller 23 is driven and rotates with the revolving of the transporting belt 21. Thus, the transporting belt 21 revolves by the driving force of the transport motor 26. The fiber M adhered to the support face 21*a* is transported by the revolving of the transporting belt 21. Note that the positions of the driving roller 22 and the driven roller 23 may be reversed.

As illustrated in FIG. 2, the printing device 11 includes a second temperature adjustment unit 18 that adjusts a surface temperature of the transport unit 20. The second temperature adjustment unit 18 is, for example, a heater. Note that a cleaning unit (not illustrated) for cleaning a lower surface of the transporting belt 21 is provided in a region below the transporting belt 21 that is a glue belt.

As illustrated in FIG. 2, the liquid ejecting unit 31 is accommodated in the housing 13 disposed above the transport unit 20. The liquid ejecting unit 31 includes nozzles 31N that open to a nozzle surface 31*a*, which is a surface facing the transporting belt 21. The nozzle surface 31*a* faces the support face 21*a* of the transporting belt 21 across a predetermined gap. The liquid ejecting unit 31 ejects droplets from the nozzles 31N. The droplets ejected from the nozzles 31N land on the front surface of the fiber M adhered onto the support face 21*a*, thereby printing an image or the like on the fiber M.

Further, the printing device 11 includes the first detection unit 33 and the second detection unit 34 as examples of a detection unit. The first detection unit 33 and the second detection unit 34 can each detect a state of the fiber M. The first detection unit 33 detects a material of the fiber M at a position upstream of the printing position (printing region). The second detection unit 34 detects a thickness of the fiber M at a position upstream of the printing position (printing region). In the example illustrated in FIG. 2, both detection units 33, 34 are supported in a posture configured to face the front surface of the fiber M being transported at an upstream end portion of the carriage 32 in the transport direction Y.

As illustrated in FIG. 1, the printing device 11 includes the input operation unit 36 operable by the user, and the control unit 100 that controls the printing device 11. The printing device 11 may include the display unit 37 capable of displaying an input screen or the like for inputting a finished state.

The input operation unit 36 is configured to enable the user to select a finished state of the fiber M after printing. The input operation unit 36 may be constituted by the display unit 37 including a touch panel type screen, for example. Note that the input operation unit 36 need only be at least one of the display unit 37 that is a touch panel type and an operation button.

The control unit 100 controls the control targets constituting the printing device 11 so that the fiber M after printing matches a condition corresponding to the finished state. The control unit 100 controls the transport unit 20 (specifically, the transport motor 26), the liquid ejecting unit 31, the carriage 32, the first temperature adjustment unit 57, and the like. Here, a condition corresponding to the finished state of the fiber M after printing refers to a printing condition corresponding to the finished state selected by the user. This printing condition includes a plurality of parameters.

Configuration of Liquid Supply Unit 45

Figure 3:
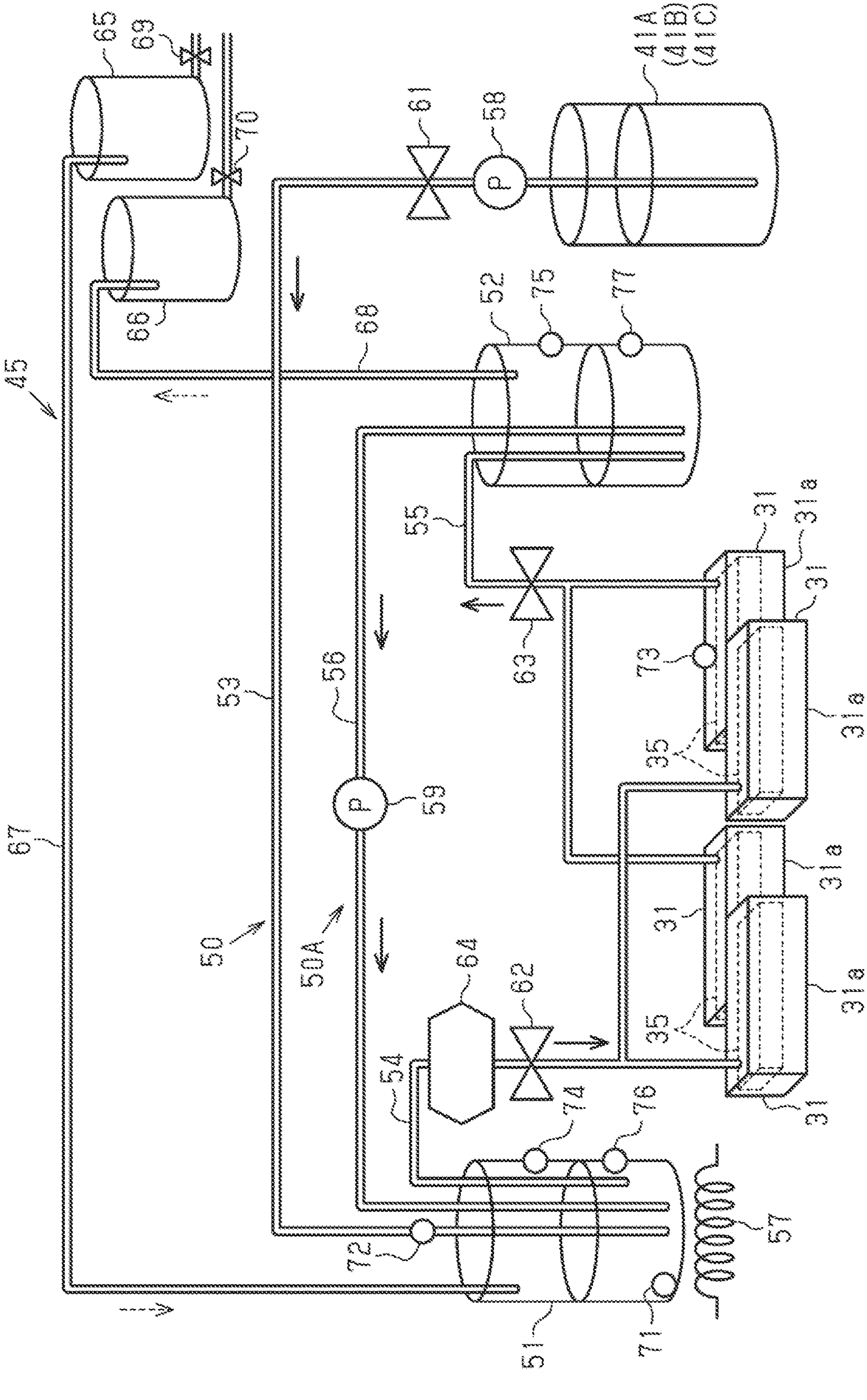
FIG. 3 is a schematic view illustrating a liquid supply unit and a liquid ejecting unit of the printing device.

Next, the liquid supply unit 45 of the printing device 11 will be described with reference to FIG. 3. Note that FIG. 3 illustrates only the liquid supply unit in which the liquid is supplied from one of the liquid accommodating bodies 41A to 41C. The example of FIG. 3 illustrates the liquid supply unit 45 of an ink system that supplies ink from the liquid accommodating body 41A.

As illustrated in FIG. 3, the liquid supply unit 45 includes the liquid accommodating bodies 41A to 41C, the supply flow path 50, a circulation pump 59, opening/closing valves 61 to 63, a filter 64, a pressurization tank 65, a depressurization tank 66, and sensors 71 to 77.

The supply flow path 50 includes the two sub-tanks 51, 52, the flow paths 53 to 56, and a pressure chamber 35 in the liquid ejecting unit 31.

One or a plurality of the liquid ejecting units 31 are provided. In the example illustrated in FIG. 3, a plurality (four, for example) of the liquid ejecting units 31 are provided. The liquid ejecting unit 31 includes the pressure chamber 35 in an interior thereof. The pressure chamber 35 communicates with the first flow path 54, the second flow path 55, and the nozzles 31N (refer to FIG. 2). The pressure chamber 35 in the liquid ejecting unit 31 constitutes a portion of the supply flow path 50.

The circulation flow path 50A is constituted by the first sub-tank 51, the first flow path 54, the pressure chambers 35, the second flow path 55, the second sub-tank 52, and the third flow path 56. The liquid (ink, for example) circulates through the first sub-tank 51, the first flow path 54, the pressure chambers 35, the second flow path 55, the second sub-tank 52, and the third flow path 56.

The liquid ejecting unit 31 includes a piezoelectric element or a drive element made of a heater element (not illustrated) for each nozzle 31N. When the drive element is driven, pressure is applied to the chamber communicating with the pressure chamber 35 and each of the nozzles 31N, and a portion of the liquid in this chamber is ejected as a droplet from the corresponding nozzle 31N.

As illustrated in FIG. 3, the liquid supplied from the first sub-tank 51 passes through a path passing through the first flow path 54 and the second flow path 55, passing through the pressure chambers 35 in the middle thereof, and is discharged into the second sub-tank 52. Furthermore, the liquid is circulated through the third flow path 56, from the second sub-tank 52 to the first sub-tank 51. Thus, the liquid supplied from the liquid accommodating bodies 41A to 41C circulates in the path of the first sub-tank 51, the pressure chambers 35 in the liquid ejecting units 31, the second sub-tank 52, and back to the first sub-tank 51. As a result, the liquid adjusted to a predetermined target temperature by the first temperature adjustment unit 57 circulates through each of the pressure chambers 35 in the plurality of liquid ejecting units 31. Here, a viscosity of the liquid depends on the temperature of the liquid. The viscosity of the liquid is controlled to a target viscosity by the temperature of the liquid being adjusted to the target temperature. A size of the droplet ejected from the nozzle 31N depends on the viscosity of the liquid, with a driving force of the drive element being under the same conditions. Therefore, the droplet size can be controlled by temperature adjustment of the liquid. Note that the configuration may be one in which the droplet size is adjustable to a plurality of stages including, for example, a small size and a large size, by controlling a drive waveform of a drive voltage that drives the drive element.

The first temperature adjustment unit 57 is one control target controlled by the control unit 100 to determine the finished state of the fiber M after printing. The temperature of the liquid adjusted by this first temperature adjustment unit 57 is one parameter for determining the finished state of the fiber M after printing.

The first temperature adjustment unit 57 is, for example, a heater. In this example, the first temperature adjustment unit 57 heats the liquid in the sub-tank 51. The liquid adjusted to the predetermined target temperature by the first temperature adjustment unit 57 circulates through the circulation flow path 50A by a path passing through the liquid ejecting units 31.

A supply pump 58 is provided in the middle of the flow path 53. Further, the opening/closing valve 61 is provided in the middle of the flow path 53. The supply pump 58 is driven with the opening/closing valve 61 open, causing the liquid in the liquid accommodating body 41A to be supplied to the first sub-tank 51 through the flow path 53.

The opening/closing valve 62 and the filter 64 are provided in positions in the middle of the first flow path 54, which is a branch type communicating with the first sub-tank 51 and two of the liquid ejecting units 31, before the branching.

Each of the pressure chambers 35 in the two liquid ejecting units 31 communicates with each of the pressure chambers 35 in the other two liquid ejecting units 31 through a flow path not illustrated. Each of the pressure chambers 35 in the other two liquid ejecting units 31 communicates with the second sub-tank 52 through the second flow path 55, which is a branch type. The opening/closing valve 63 is provided in a portion in the middle of the second flow path 55 before the branching.

A space (air chamber) above a liquid surface in the first sub-tank 51 communicates with the pressurization tank 65 through a flow channel 67. The pressurization tank 65 is pressurized to a predetermined pressure. When an opening/closing valve 69 opens, pressurized air is supplied into the pressurization tank 65, and the pressure in the pressurization tank 65 rises.

The space (air chamber) above the liquid surface in the second sub-tank 52 communicates with the depressurization tank 66 through a flow path 68. The depressurization tank 66 is depressurized to a predetermined pressure. When an opening/closing valve 70 opens, the air is forcibly discharged from within the depressurization tank 66, reducing the pressure in the depressurization tank 66.

Note that the pressure adjustment mechanisms for adjusting the pressure in the pressurization tank 65 and in the depressurization tank 66 are not limited to those described above. For example, the configuration may be one in which a pressurization pump (not illustrated) is coupled to the pressurization tank 65, and the pressure inside the pressurization tank 65 is raised by driving the pressurization pump. In this case, the opening/closing valve 69 may function as a relief valve that allows air to escape to ensure a target pressure inside the pressurization tank 65. Further, the configuration may be one in which a depressurization pump (not illustrated) is coupled to the depressurization tank 66, and the pressure inside the depressurization tank 66 is lowered by driving the depressurization pump. In this case, the opening/closing valve 70 may function as a relief valve that captures air to ensure a target pressure inside the depressurization tank 66.

The liquid supply unit 45 includes the plurality of temperature sensors 71 to 73 that detect the temperature of the liquid in the supply flow path 50. The temperature sensor 71 detects the temperature of the liquid in the first sub-tank 51. The temperature sensor 72 detects the temperature in the flow path 53. The temperature sensor 73 detects the temperature of the liquid in the pressure chamber 35 in the liquid ejecting unit. Note that the configuration may be one in which only one or two of the three temperature sensors 71 to 73 are provided.

The first sub-tank 51 is provided with the pressure sensor 74 that detects a pressure of the space (air chamber) above the liquid surface in an interior thereof. When the pressure detected by the pressure sensor 74 is below the target pressure, exceeding an allowable limit, the opening/closing valve 69 is opened and the pressure inside the pressurization tank 65 is increased. As a result, the pressure of the air chamber in the first sub-tank 51 is adjusted to the target pressure.

The second sub-tank 51 is provided with the pressure sensor 75 that detects a pressure of the space (air chamber) above the liquid surface in an interior thereof. When the pressure detected by the pressure sensor 75 is above the target pressure, exceeding an allowable limit, the opening/closing valve 70 is opened and the pressure inside the depressurization tank 66 is lowered. As a result, the pressure of the air chamber in the second sub-tank 52 is adjusted to the target pressure.

Here, a first pressure P1, which is the pressure of the air chamber in the first sub-tank 51, is set to be higher than a second pressure P2, which is the pressure of the air chamber in the second sub-tank 52 (P1>P2). The pressures P1, P2 when the liquid is circulated are set to values at which the liquid does not drip from the nozzles 31N of the liquid ejecting unit 31 and air is not suctioned from the nozzles 31N. In other words, the pressures P1, P2 are set to values at which a meniscus of the liquid formed in each nozzle 31N is retained.

For example, the circulation pump 59 is driven with the two opening/closing valves 62, 63 open during a standby operation and during printing of the printing device 11. Accordingly, the liquid circulates through the circulation flow path 50A formed by the first sub-tank 51, the first flow path 54, the pressure chambers 35, the second flow path 55, the second sub-tank 52, and the third flow path 56. By circulation of this liquid, the liquid in the pressure chambers 35 is maintained at the target temperature adjusted by the first temperature adjustment unit 57.

Note that, during cleaning of the liquid ejecting unit 31, a cleaning pressure from the pressurization tank 65 is supplied to the first sub-tank 51 with the circulation pump 59 stopped and the opening/closing valve 63 closed. When the opening/closing valve 62 opens in this pressurized state, the liquid is forcibly discharged from all nozzles 31N of the liquid ejecting unit 31. By this cleaning, foreign material such as thickened ink and bubbles in the nozzles 31N is forcibly discharged to the outside together with liquid, and clogging of the nozzles 31N is prevented or eliminated. The liquid discharged from the nozzles 31N by the cleaning passes through a cap and is collected in a waste tank (both not illustrated).

The first sub-tank 51 is provided with the remaining amount sensor 76 that detects a remaining amount of the liquid in the interior thereof. The second sub-tank 52 is provided with the remaining amount sensor 77 that detects a remaining amount of the liquid in an interior thereof. When the remaining amount sensor 76 detects that the remaining amount in the first sub-tank 51 has reached a threshold value, the supply pump 58 is driven with the opening/closing valve 61 open. As a result, the liquid is supplied from the liquid accommodating body 41A to the first sub-tank 51. When the remaining amount sensor 77 detects that the remaining amount in the second sub-tank 52 has reached a threshold value, the two opening/closing valves 62, 63 open with the circulation pump 59 stopped. Then, the liquid is supplied from the first sub-tank 51 to the second sub-tank 52 through the first flow path 54, the pressure chambers 35, and the second flow path 55.

Note that the location where the first temperature adjustment unit 57 heats the liquid in the supply flow path 50 for temperature adjustment is not limited to the first sub-tank 51. The first temperature adjustment unit 57 need only be provided at a location where the liquid in the supply flow path 50 can be heated for temperature adjustment. The first temperature adjustment unit 57 may be, for example, a heater that heats the second sub-tank 52 on the downstream side, or a heater that heats the liquid in the pressure chambers 35 of the liquid ejecting unit 31 for temperature adjustment. Further, the first temperature adjustment unit 57 may be a heater that heats the liquid in the first flow path 54 between the first sub-tank 51 and the pressure chambers 35, or a heater that heats the liquid in the second flow path 55 between the pressure chambers 35 and the second sub-tank 52. Furthermore, the first temperature adjustment unit 57 may be a heater that heats the liquid in the third flow path 56 that communicates with the second sub-tank 52 and the first sub-tank 51.

Electrical Configuration of Printing Device

Next, an electrical configuration of the printing device 11 will be described with reference to FIG. 4.

Figure 4:
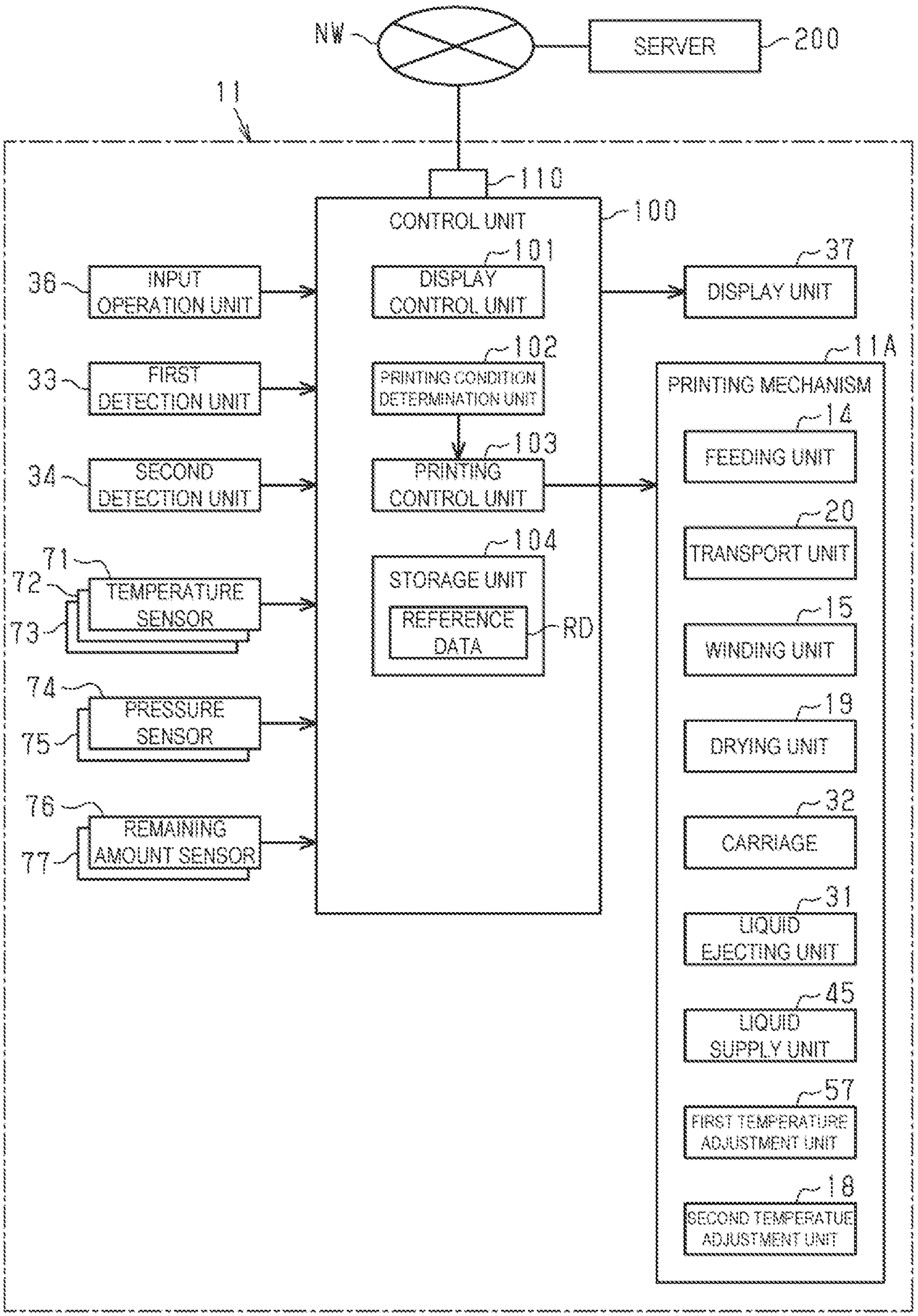
FIG. 4 is a block diagram illustrating an electrical configuration of the printing device.

As illustrated in FIG. 4, as an input system, the input operation unit 36, the first detection unit 33, the second detection unit 34, the temperature sensors 71 to 73, and the remaining amount sensors 76, 77 are electrically coupled to the control unit 100. Further, as an output system, the display unit 37 and a printing mechanism 11A are electrically coupled to the control unit 100. The printing mechanism 11A includes the feeding unit 14, the transport unit 20, the winding unit 15, the drying unit 19, the carriage 32, the liquid ejecting unit 31, the liquid supply unit 45, the first temperature adjustment unit 57, and the second temperature adjustment unit 18.

The control unit 100 includes a display control unit 101, a printing condition determination unit 102, a printing control unit 103, and a storage unit 104.

The display control unit 101 displays an operation screen, various messages, and the like. The operation screen includes the finished state input screen 90 illustrated in FIG. 9. The user can select and input a finished state on the finished state input screen 90 by operating the input operation unit 36 constituted by a touch panel operation function of the display unit 37. Further, the display control unit 101 displays a plurality of parameter values defining the printing conditions determined by the printing condition determination unit 102 on the display unit 37. The user confirming the plurality of parameter values performs an operation that applies the printing conditions and then operates a print start button (not illustrated) of the printing device 11, thereby starting the printing operation.

The printing condition determination unit 102 determines the plurality of parameters defining the printing conditions corresponding to the selected finished state on the basis of a finished state instruction value input on the finished state input screen 90. That is, the printing condition determination unit 102 determines the plurality of parameters defining the printing conditions by which the finished state selected by the user will be achieved.

When the printing condition determination unit 102 determines the printing conditions and the user performs an operation applying the printing conditions on the screen, the printing control unit 103 drives and controls the printing mechanism 11A in accordance with the plurality of parameter values defining the applied printing conditions.

The storage unit 104 stores reference data RD referenced when the printing condition determination unit 102 determines the plurality of parameter values.

Further, the control unit 100 is coupled to a network NW through a communication unit 110. A server 200 is coupled to the network NW. The control unit 100 may be configured to acquire, from the server 200, the plurality of parameter values defining the printing conditions corresponding to the finished state of the fiber M after printing selected by the user. In this case, the control unit 100 requests the server 200 to perform the processing of the printing condition determination unit 102. That is, the control unit 100 transmits a finished state instruction value to the server 200, and causes the server 200 to calculate the plurality of parameter values on the basis of the finished state instruction value. The control unit 100 may download the plurality of parameter values defining the printing conditions by which the instructed finished state is to be achieved from the server 200.

The first temperature adjustment unit 57 is one control target controlled by the control unit 100 to obtain the selected finished state. The control unit 100 controls the first temperature adjustment unit 57, thereby adjusting the temperature of the liquid in the supply flow path 50. That is, the temperature of the liquid ejected by the liquid ejecting unit 31 is adjusted. The control unit 100 adjusts the viscosity of the liquid by adjusting the temperature of the liquid ejected by the liquid ejecting unit 31. The size of the droplet ejected by the liquid ejecting unit 31 depends on the viscosity of the liquid, with the intensity at which the liquid ejecting unit 31 is driven being the same. Therefore, a liquid volume per droplet ejected from the liquid ejecting unit 31 changes by the temperature of the liquid. The liquid volume per droplet ejected from the liquid ejecting unit 31 affects the finished state of the fiber M after printing. That is, the temperature of the liquid ejected by the liquid ejecting unit 31 is one parameter for determining the finished state of the fiber M after printing.

Further, the transport unit 20 is one control target. The control unit 100 controls the transport velocity of the transport unit 20 (specifically, the transport motor 26) as a control target so as to match a condition corresponding to the finished state specified from the input operation unit 36. A transport distance is constant from the printing position where the liquid ejecting unit 31 ejects the liquid onto the fiber M to a drying position where the fiber M after printing starts to be dried by the drying unit 19. Therefore, the transport velocity of the fiber M determines a drying waiting time from when the liquid lands on the fiber M at the printing position to the start of drying of the fiber M after printing at the drying position. That is, the transport velocity of the fiber M determines the drying waiting time from the end of printing to the start of drying of the fiber M after printing. This drying waiting time determines a readiness at which the liquid soaks into the fiber M. The longer the drying waiting time, the longer the soaking time can be maintained for soaking the landed liquid into the fiber M, which tends to result in a deeper soaking depth of the liquid into the fiber M. That is, when the drying waiting time is a first waiting time, the soaking depth tends to be a first soaking depth that is less than a second soaking depth, the second soaking depth being a soaking depth of the liquid into the fiber M at a second waiting time longer than the first waiting time. This soaking depth of the liquid into the fiber M affects the finished state of the fiber M after printing. That is, the transport velocity of the fiber M after printing is one parameter for determining the finished state of the fiber M after printing.

Further, the second temperature adjustment unit 18 is one control target. The control unit 100 controls the second temperature adjustment unit 18 as a control target so as to match a condition corresponding to the finished state specified by the input operation unit 36. The second temperature adjustment unit 18 adjusts a surface temperature of the transport unit 20 (specifically, the transporting belt 21). The surface temperature of the transport unit 20 is one parameter for determining the finished state of the fiber M after printing.

Furthermore, the carriage 32 is one control target. The control unit 100 controls the carriage 32 as a control target so as to match a condition corresponding to the finished state specified by the input operation unit 36. A movement velocity of the carriage 32 affects the soaking time during which the liquid adhering to the front surface of the fiber M after printing soaks into the fiber M in a thickness direction. Thus, the movement velocity of the carriage 32 is one parameter for determining the finished state of the fiber M after printing.

The liquid ejecting unit 31 is one control target. The control unit 100 controls the liquid ejecting unit 31 as a control target so as to match a condition corresponding to the finished state specified by the input operation unit 36. The control unit 100 controls the liquid ejecting unit 31, thereby controlling the liquid volume of the droplet ejected by the liquid ejecting unit 31. The readiness at which the liquid soaks into the fiber M changes depending on the ejected liquid volume per droplet of the liquid ejected from the liquid ejecting unit 31. When the ejected liquid volume per droplet is a first ejected liquid volume, the soaking depth tends to be the first soaking depth that is less than the second soaking depth, the second soaking depth being the soaking depth of the liquid into the fiber M at a second ejected liquid volume having a greater ejected liquid volume per droplet than the first ejected liquid volume. The ejected liquid volume per droplet of liquid that determines the readiness at which the liquid soaks into the fiber M affects the finished state of the fiber M after printing. That is, the ejected liquid volume per droplet by the liquid ejecting unit 31 is one parameter for determining the finished state of the fiber M after printing.

The control unit 100 controls the liquid ejecting unit 31, thereby controlling an ejection velocity of the droplet ejected by the liquid ejecting unit 31. The readiness at which the liquid soaks into the fiber M depends on the ejection velocity of ejection by the liquid ejecting unit 31, with the liquid volume per droplet ejected from the liquid ejecting unit 31 being the same. The ejection velocity of the droplet that determines the readiness at which the liquid soaks into the fiber M affects the finished state of the fiber M after printing. That is, the ejection velocity of the droplet is one parameter for determining the finished state of the fiber M after printing.

Furthermore, the second temperature adjustment unit 18 is one control target. The control unit 100 controls the second temperature adjustment unit 18, thereby adjusting a temperature of the adhesive layer 25 of the transporting belt 21, which is a glue belt. The temperature of the adhesive layer 25 affects a drying velocity, after printing, of the fiber M adhered to the adhesive layer 25. The drying velocity of the fiber M after printing determines the readiness at which the liquid soaks into the fiber M. When the drying velocity is a first drying velocity, the soaking depth tends to be the first soaking depth that is less than the second soaking depth, the second soaking depth being a soaking depth of the liquid into the fiber M at a second drying velocity shorter than the first drying velocity. This soaking depth of the liquid into the fiber M affects the finished state of the fiber M after printing. That is, the temperature of the adhesive layer 25 is one parameter for determining the finished state of the fiber M after printing.

The control unit 100 controls the control target so as to match a condition corresponding to a combination of the selected finished state and the state of the fiber M detected by the detection units 33, 34. Further, the control unit 100 controls the control target so as to match a condition corresponding to a combination of the selected finished state and the state of the fiber M input from input units 92, 93 described below by an operation of the input operation unit 36. Here, the state of the fiber M includes at least one of the material of the fiber M and the thickness of the fiber M. Note that the details of other control targets and parameters will be described below.

Finished State Input Screen

Figure 5:
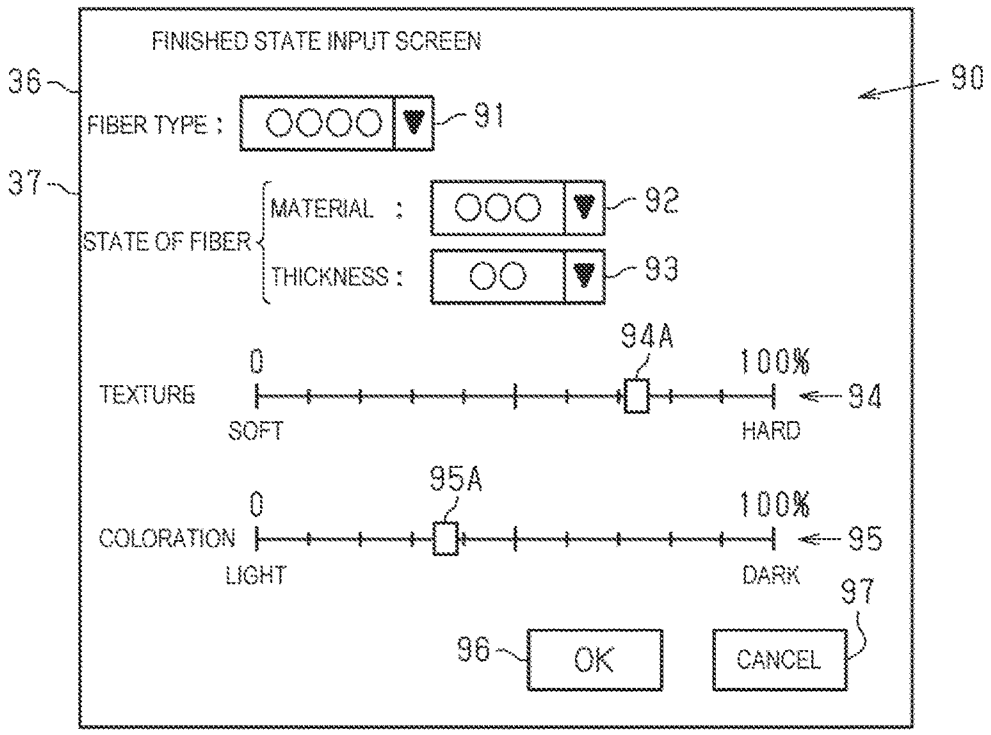
FIG. 5 is a schematic view illustrating a finished state input screen.

Next, with reference to FIG. 5, the finished state input screen displayed on the display unit 37 will be described. The finished state input screen 90 illustrated in FIG. 5 is an input screen configured to accept an input of the finished state of the fiber M after printing desired by the user. The user can operate the input operation unit 36 to input values and select options on the finished state input screen 90 (hereinafter also simply referred to as "input screen 90"). The input screen 90 of this example can be operated by the input operation unit 36 composed of a touch operation function of the display unit 37 of a touch panel type. The material input unit 92 is provided with common materials as options for the fiber M, such as cotton, wool, silk, blended fabric, as well as polyester, a chemical fiber.

The thickness input unit 93 is provided with options for the thickness of the fiber M. The thickness can be input by, for example, selecting and inputting a value to one or two decimal places in units of millimeters.

Furthermore, the input screen 90 includes a texture selection unit 94 that enables selection of a texture, which is one finished state of the fiber M after printing. The texture selection unit 94 includes a slider that enables a sliding operation. The texture selection unit 94 is constituted by a slider including a scale with 0% as a softest texture and 100% as a hardest texture, and an operation unit 94A that enables the sliding operation along the scale. The user can operate the operation unit 94A to select the texture by a numerical value (%) within a range from 0 to 100%.

Further, the input screen 90 includes a coloration selection unit 95 that enables selection of coloration, which is one finished state of the fiber M after printing. The coloration selection unit 94 is constituted by a slider including a scale with 0% as a lightest coloration and 100% as a darkest coloration, and an operation unit 95A that enables the sliding operation along the scale. The user can operate the operation unit 95A to select the coloration by a numerical value (%) within a range from 0 to 100%. By operating a fiber type input unit 91, the material input unit 92, the thickness input unit 93, the texture selection unit 94, and the coloration selection unit 95, the user can specify the fiber type, the material and the thickness as the state of the fiber M, and the texture and the coloration as the finished state.

Note that, when the first detection unit 33 and the second detection unit 34 are provided, the material of the fiber M detected by the first detection unit 33 and the thickness of the fiber M detected by the second detection unit 34 may be displayed on the input units 92, 93. In this case, the user confirms the detection results of the detection units 33, 34 detecting the fiber M using the input units 92, 93. If the detection results are correct, the user leaves the results as is. If the detection results are mistaken, the user pulls down the input units 92, 93 and changes at least one of the material and the thickness of the fiber M to the correct value.

The input screen 90 includes an OK button 96 operated to apply input content, and a cancel button 97 operated to cancel input. The user operates the OK button 96 to apply the input content and the selected content. The applied input values and selected values are received by the control unit 100.

Processing of Printing Condition Determination Unit 102

Figure 6:
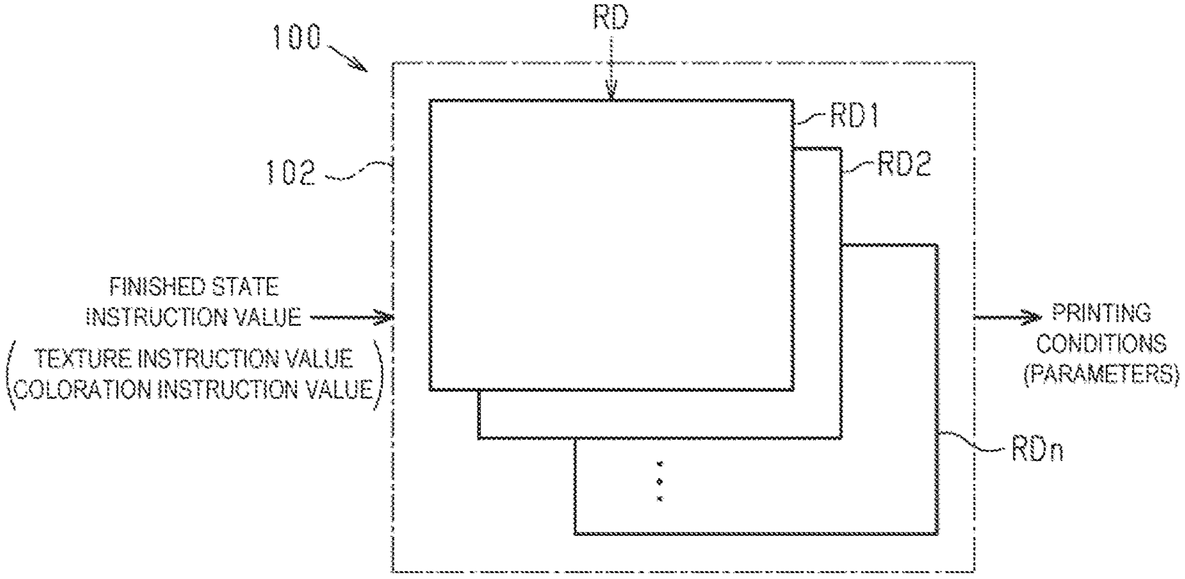
FIG. 6 is a schematic view for describing a printing condition determination unit.

Next, with reference to FIG. 6, a process by which the printing condition determination unit 102 determines parameters (printing parameters) defining the printing conditions from the selected values of the finished state will be described.

The control unit 100 controls the control target so as to match the "texture" obtained by the user specifying a value by operating the texture selection unit 94 and the "coloration" obtained by the user specifying a value by operating the coloration selection unit 95 on the input screen 90. The printing condition determination unit 102 determines the parameters defining the printing conditions so as to match the finished state (texture, coloration) specified using the input operation unit 36 and the input screen 90 (FIG. 5) constituting an example of the selection unit. The printing condition determination unit 102 reads the reference data RD from the storage unit 104. The reference data RD includes a plurality of reference data RDi (where the subscript i is 1, 2, . . . , n) prepared for each fiber type. The printing condition determination unit 102 determines the plurality of parameters defining the printing conditions by referring to the reference data RDi corresponding to the fiber type input at the time, on the basis of the input finished state instruction values (texture instruction value, coloration instruction value). The printing condition determination unit 102 transmits the plurality of parameters specifying the printing conditions thus determined to the printing control unit 103. The printing control unit 103 controls the printing mechanism 11A according to the determined printing conditions (parameters).

Note that, in this exemplary embodiment, an example of a selection unit is constituted by the input operation unit 36 and the texture selection unit 94. Further, an example of the selection unit is constituted by the input operation unit 36 and the coloration selection unit 95. Further, in this exemplary embodiment, an example of an input unit is constituted by the input operation unit 36 and the material input unit 92. Furthermore, an example of the input unit is constituted by the input operation unit 36 and the thickness input unit 93.

Parameters of Printing Conditions Corresponding to Finished State

Next, with reference to FIG. 7, the parameters of the printing conditions corresponding to the finished state will be described. FIG. 7 illustrates an overview of the reference data RD. FIG. 7 indicates only the trend of how each parameter affects the finished state.

As illustrated in FIG. 7, there are seven parameters, (a) to (g), illustrated in the drawing and described hereinafter that define the printing conditions corresponding to the finished state selected by the user in this exemplary embodiment.

(a) Temperature of liquid in supply flow path 50 (liquid temperature).

(b) Transport velocity of fiber M (fiber transport velocity).

(c) Surface temperature of transport unit 20 (transport surface temperature).

(d) Movement velocity of carriage 32 (carriage movement velocity).

(e) Number of printing passes.

(f) Ejected liquid volume.

(g) Liquid ejection velocity.

As illustrated in FIG. 7, the finished state of the fiber M after printing includes texture and coloration. Different parameters have different effects on texture and coloration.

The control unit 100 controls the first temperature adjustment unit 57 using the parameter value of the liquid temperature indicated by (a) above. That is, the first temperature adjustment unit 57 is a control target for obtaining the finished state of the fiber M after printing selected by the user. When a liquid temperature, such as an ink temperature, is low, the viscosity of the liquid, such as ink, increases, and thus a liquid such as ink readily remains in a surface layer of the fiber M. Therefore, the coloration is dark, but the texture is harder. Conversely, when a liquid temperature, such as an ink temperature, is high, the viscosity of the liquid, such as ink, decreases, and thus a liquid such as ink readily permeates the fiber M in the thickness direction. As a result, the coloration is light, but the texture is softer.

The control unit 100 controls the transport unit 20 using the parameter value of the fiber transport velocity indicated by (b) above. That is, the transport unit 20 is a control target for obtaining the finished state of the fiber M after printing selected by the user. When the transport velocity of the fiber M is slow, the required time until the fiber M reaches the drying unit 19 lengthens, lengthening the ink soaking time until the fiber M is dry, and thus a liquid such as ink readily permeates the fiber M in the thickness direction. As a result, the coloration is light, but the texture is softer. Conversely, when the transport velocity of the fiber M is fast, the required time until the fiber M reaches the drying unit 19 shortens, shortening the ink soaking time until the fiber M is dry, and thus a liquid such as ink readily remains in the surface layer. Therefore, the coloration is dark, but the texture is harder.

The control unit 100 controls the second temperature adjustment unit 58 using the parameter value of the transport surface temperature indicated by (c) above. That is, the second temperature adjustment unit 58 is a control target for obtaining the finished state of the fiber M after printing selected by the user. When the transport surface temperature is low, the temperature of the fiber M itself in contact with the transport surface decreases, causing the temperature of a liquid such as ink soaking into the fiber M in the thickness direction to readily decrease upon adherence or after adherence to the fiber M. The viscosity of a liquid such as ink increases after adherence to the fiber M, and thus a liquid such as ink readily remains in the surface layer of the fiber M. Therefore, the coloration is dark, but the texture is harder. Conversely, when the transport surface temperature is high, the temperature of the fiber M itself increases, causing the viscosity of a liquid such as ink soaking into the fiber M in the thickness direction to readily decrease upon adherence or after adherence to the fiber M. A liquid such as ink having low viscosity readily soaks into the fiber M in the thickness direction. As a result, the coloration is light, but the texture is softer.

The control unit 100 controls the carriage 32 using the parameter value of the carriage movement velocity indicated in (d) above. That is, the carriage 32 is a control target for obtaining the finished state of the fiber M after printing selected by the user. Note that, specifically, a carriage motor (not illustrated) that is a driving source of the carriage 32 is a control target. When the carriage movement velocity is slow, an interval time of intermittent transport of the fiber M lengthens, and thus the transport velocity of the fiber M becomes slower. The required time until the fiber M reaches the drying unit 19 then lengthens, lengthening the ink soaking time until the fiber M is dry, and thus a liquid such as ink readily soaks into the fiber M in the thickness direction. As a result, the coloration is light, but the texture is softer. Conversely, when the carriage movement velocity is fast, the interval time of the intermittent transport of the fiber M performed alternately with a movement operation of the carriage 32 shortens, and thus the transport velocity of the fiber M becomes faster. The required time until the fiber M reaches the drying unit 19 then shortens, shortening the ink soaking time until the fiber M is dry, and thus a liquid such as ink readily remains in the surface layer. Therefore, the coloration is dark, but the texture is harder.

The control unit 100 controls the carriage 32 using a parameter value of the number of printing passes indicated in (e) above. That is, the carriage 32 is a control target for obtaining the finished state of the fiber M after printing selected by the user. Specifically, the carriage motor (not illustrated) is a control target. Here, the number of printing passes is the number of movements (passes) of the carriage 32 in the scanning direction X in order to print one printing line. An ink volume used for printing one printing line can be regarded as basically the same, and thus the larger the number of printing passes, the smaller the ejected ink volume per pass. That is, an ink duty per pass lowers. The ink duty is the ejected ink volume per unit area of the fiber M. When the number of printing passes is small, the ink duty is high, and thus a liquid such as ink readily remains in the surface layer of the fiber M. Therefore, the coloration is dark, but the texture is harder. Conversely, when the number of printing passes is large, the ink duty ratio is low, and thus a liquid such as ink readily soaks into the fiber M in the thickness direction. As a result, the coloration is light, but the texture is softer.

The parameter of the ejected liquid volume indicated in (f) above is the ejected volume of one ejection from the liquid ejecting unit 31. The control unit 100 controls the liquid ejecting unit 31 using the parameter value of this ejected liquid amount. That is, the liquid ejecting unit 31 is a control target for obtaining the finished state of the fiber M after printing selected by the user. When the ejected liquid volume of the liquid ejecting unit 31 is small, the ink layer is thinner. In particular, in the case of resin ink, when the ejected liquid volume is small, the resin amount is smaller. As a result, the coloration is light, but the texture is softer. Conversely, when the ejected liquid volume of the liquid ejecting unit 31 is large, the ink layer is thicker. In particular, in the case of resin ink, when the ejected liquid volume is large, the resin amount is larger. Therefore, the coloration is dark, but the texture is harder. Note that, when one ejection is divided into two droplets, these two droplets are regarded as one ejected volume.

The control unit 100 controls the liquid ejecting unit 31 using a parameter value of the liquid ejection velocity indicated in (g) above. That is, the liquid ejecting unit 31 is a control target for obtaining the finished state of the fiber M after printing selected by the user. When the liquid ejection velocity of the liquid ejecting unit 31 is slow, a liquid such as ink lacks momentum and thus accumulates on the front surface of the fiber M. Therefore, the coloration is dark, but the texture is harder. Conversely, when the liquid ejection velocity of the liquid ejecting unit 31 is fast, a liquid such as ink has momentum and thus readily soaks into the fiber M in the thickness direction. As a result, the coloration is light, but the texture is softer.

Incidentally, a degree of influence of each parameter on the finished state differs for each fiber type. Therefore, the reference data RD may be prepared for each fiber type as illustrated in FIG. 6. In this case, the control unit 100 determines the value of the parameter defining a condition corresponding to the specified finished state with reference to the reference data RDi corresponding to the fiber type specified by the fiber type input unit 91. Furthermore, the degree of influence of each parameter on the finished state strictly differs for each state of the fiber M as well. The state of the fiber M includes the material of the fiber M and the thickness of the fiber M. Therefore, the reference data RD may be prepared for each combination of the fiber type and at least one of the material and the thickness of the fiber M. For example, the control unit 100 selects the reference data RDi corresponding to the combination of the fiber type specified by the fiber type input unit 91 and at least one of the material and the thickness specified by the material input unit 92 and the thickness input unit 93. The control unit 100 determines the value of the parameter defining a condition corresponding to the specified finished state with reference to the selected reference data RDi.

Actions of First Exemplary Embodiment

Next, description will be made of actions of the printing device 11 according to this exemplary embodiment.

The user operates the input operation unit 36, displaying the display unit 37 on the finished state input screen 90. The user inputs the fiber type and the state of the fiber M. The user inputs the material and the thickness as the states of the fiber M. That is, on the input screen 90, the user pulls down the material input unit 92 and selects the material of the fiber M from the options. Further, on the input screen 90, the user pulls down the thickness input unit 92 and selects the thickness of the fiber M from the options. The thickness is input by, for example, inputting a value to one or two decimal places in units of millimeters.

Furthermore, on the input screen 90, the user selects a texture, which is one finished state of the fiber M after printing. The user selects, on the input screen 90, the texture by a numerical value (%) by sliding the operation unit 94A of the texture selection unit 94 with 0% as the softest texture and 100% as the hardest texture.

Further, on the input screen 90, the user selects the coloration, which is one finished state of the fiber M after printing. On the input screen 90, the user selects the coloration by a numerical value (%) by sliding the operation unit 95A of the coloration selection unit 94 with 0% as the lightest coloration and 100% as the darkest coloration. Thus, by operating the fiber type input unit 91, the material input unit 92, the thickness input unit 93, the texture selection unit 94, and the coloration selection unit 95, the user specifies the fiber type, the material and the thickness of the fiber M which are affiliated with the state of the fiber M, and the texture and the coloration which are affiliated with the finished state. On the input screen 90, only one of the texture selection unit 94 or the coloration selection unit 95 may be configured to be operable. Further, only one of the texture selection unit 94 and coloration selection unit 95 may be operated, whichever is preferred, and the other may be automatically set to a condition suitable thereto.

Here, the material of the fiber M detected by the first detection unit 33 and the thickness of the fiber M detected by the second detection unit 34 may be displayed on the input screen 90. In this case, the user confirms the detection results of the detection units 33, 34 detecting the fiber M and, if the detection results are correct, leaves the results as is and, if the detection results are mistaken, pulls down the input units 92, 93 and changes at least one of the material and the thickness of the fiber M to the correct value.

After thus completing the inputs on the input screen 90, the user operates the OK button 96. Then, each of these input values is received by the control unit 100. The control unit 100 determines the parameter specifying the printing condition corresponding to the finished state based on each input value received. The determination of this parameter is performed by the printing condition determination unit 102.

The printing condition determination unit 102 determines, on the basis of the plurality of input values, the plurality of parameters defining the printing conditions by referencing the reference data RDi corresponding to the fiber type. The printing condition determination unit 102 transmits the determined printing conditions (parameters) to the display control unit 101. The display control unit 101 displays, on the display unit 37, a printing condition display screen (not illustrated) including a value for each parameter (item) specifying the determined printing condition. The user confirms each parameter value of the printing conditions on the printing condition display screen and, if the printing conditions are acceptable, operates the OK button on that screen to apply the printing conditions. Each parameter value of the applied printing conditions is transmitted from the printing condition determination unit 102 to the printing control unit 103. Subsequently, when the user operates a printing start button (not illustrated) on the operation screen (not illustrated), the printing device 11 starts printing.

The printing control unit 103 controls a plurality of the control targets constituting the printing mechanism 11A according to each parameter value of the applied printing conditions.

As a result, an image or the like is printed on the fiber M using the "texture" specified by the user on the input screen 90 by a value within the range from 0 to 100% by the slide operation of the texture selection unit 94, and the darkness of the coloration specified by a value within the range from 0 to 100% by the slide operation of the coloration selection unit 95.

Note that the parameter information and the like determined by the printing device 11 are transmitted to the server 200. The server 200 improves the reference data RD on the basis of printing condition information collected from a large number of the printing devices 11. Then, the improved reference data RD is downloaded from the server 200 to the printing device 11. As a result, the printing device 11 facilitates acquisition of the finished state selected by the user.

Further, the server 200 may be configured to acquire an instruction value of the selected finished state from the printing device 11 and, instead of the printing condition determination unit 102, find the parameters of the printing conditions by which the finished state corresponding to the finished state instruction value can be obtained and transmit the parameters to the printing device 11.

Effects of First Exemplary Embodiment

According to the first exemplary embodiment, the following effects can be achieved.

(1-1) The printing device 11 includes the liquid ejecting unit 31 configured to eject a liquid and perform printing on the fiber M to be transported, and the supply flow path 50 for supplying liquids accommodated in the liquid accommodating bodies 41A to 41C to the liquid ejecting unit 31. Furthermore, the printing device 11 includes the selection units 94, 95 configured to enable a user to select a finished state of the fiber M after printing, and the first temperature adjustment unit 57 capable of adjusting the temperature of the liquid in the supply flow path 50. The printing device 11 includes the control unit 100 that controls the first temperature adjustment unit 57 as a control target. The control unit 100 controls the first temperature adjustment unit 57 so that the temperature of the liquid in the supply flow path 50 matches a condition corresponding to the finished state specified by the selection units 94, 95. According to this configuration, it is possible to express differences in the finished state even with one type of fiber M.

(1-2) The printing device 11 further includes the transport unit 20 that transports the fiber M. The control unit 100 controls the transport velocity of the transport unit 20 as a control target so as to match a condition corresponding to the finished state specified by the selection units 94, 95. According to this configuration, it is possible to express subtle differences in the finished state even with one type of fiber M.

(1-3) The printing device 11 includes the transport unit 20 that transports the fiber M, and the second temperature adjustment unit 18 capable of adjusting the surface temperature of the transport unit 20. The control unit 100 controls the second temperature adjustment unit 18 as a control target so as to match a condition corresponding to the finished state specified by the selection units 94, 95. According to this configuration, it is possible to express subtle differences in the finished state even with one type of fiber M.

(1-4) The printing device 11 further includes the carriage 32, which is an example of the moving unit, provided with the liquid ejecting unit 31 and movable in the scanning direction X. The control unit 100 controls the carriage 32 as a control target so as to match a condition corresponding to the finished state specified by the selection units 94, 95. According to this configuration, it is possible to express subtle differences in the finished state even with one type of fiber M. In particular, the carriage movement velocity and the number of printing passes are set as parameters. Thus, it is possible to further express subtle differences in the finished state even with one type of fiber M.

(1-5) The control unit 100 controls the liquid ejecting unit 31 as a control target so as to match a condition corresponding to the finished state specified by the selection units 94, 95. According to this configuration, it is possible to express subtle differences in the finished state even with one type of fiber M. In particular, the ejected liquid volume and the liquid ejection velocity are set as parameters. Thus, it is possible to further express subtle differences in the finished state even with one type of fiber M.

(1-6) The printing device 11 further includes the detection units 33, 34 capable of detecting states of the fiber M. The control unit 100 controls the control target so as to match a condition corresponding to a combination of the selected finished state and the detected states of the fiber M. According to this configuration, it is possible to express subtle differences in the finished state even with one type of fiber M.

(1-7) The printing device 11 further includes the fiber type input unit 91 as an example of an input unit capable of inputting a fiber type that is the type of the fiber M. The control unit 100 controls the control target so as to match a condition corresponding to a combination of the selected finished state and the input fiber type. According to this configuration, it is possible to express subtle differences in the finished state taking into account differences in the type of the fiber M.

(1-8) The printing device 11 further includes the input units 92, 93 capable of inputting states of the fiber M. The control unit 100 controls the control target so as to match a condition corresponding to a combination of the selected finished state and the input states of the fiber M. According to this configuration, it is possible to express subtle differences in the finished state even with one type of fiber M.

(1-9) The state of the fiber M includes at least one of the material of the fiber M and the thickness of the fiber M. According to this configuration, it is possible to express subtle differences in the finished state even with one type of fiber M.

Second Exemplary Embodiment

Next, a second exemplary embodiment of the printing device including the liquid ejecting unit will be described with reference to FIG. 8 to FIG. 10. This printing device 11 differs from that of the first exemplary embodiment in the configuration of the transport unit 20. The transport unit 20 is not a belt transport type, but is a roller transport type. Further, the second exemplary embodiment differs from the first exemplary embodiment in including a suction unit 130 that suctions the fiber M onto the transport surface instead of the adhesive layer 25 that adheres the fiber M to the transport surface. Note that, for a configuration common to or the same as that of the printing device 11 of the first exemplary embodiment, the member, mechanism, or the like will be given an identical reference numeral and detailed description thereof will be omitted.

Figure 8:
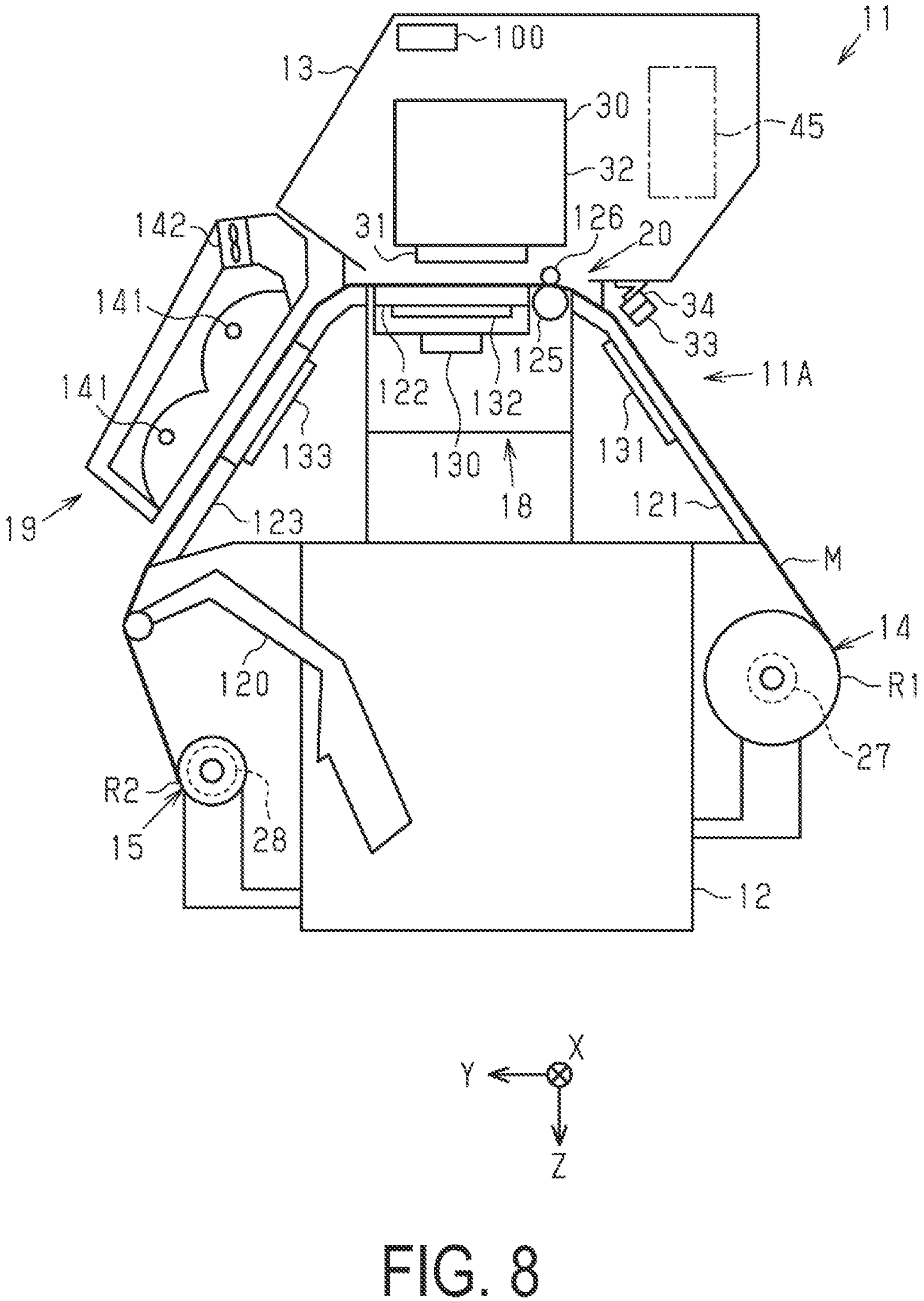
FIG. 8 is a schematic side diagram illustrating the printing device according to a second exemplary embodiment.
Figure 9:
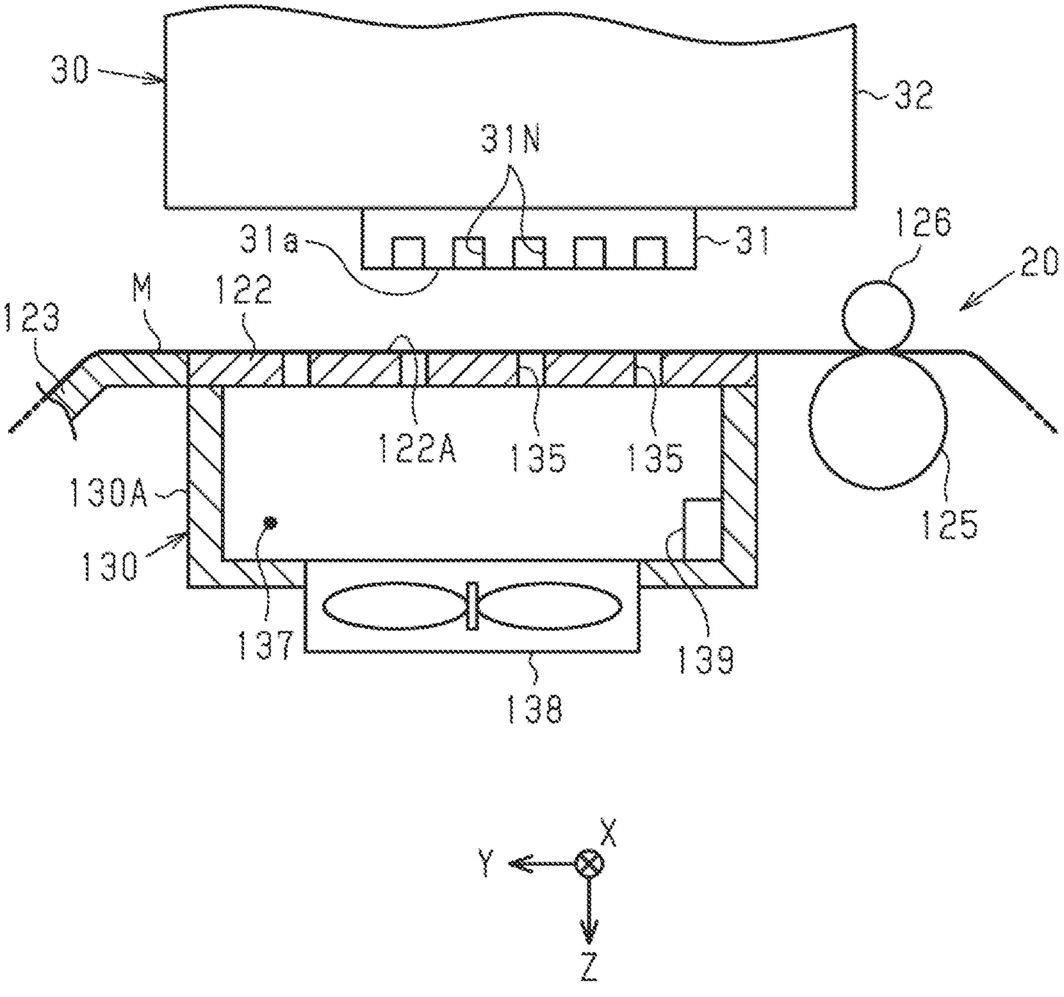
FIG. 9 is a schematic side sectional view illustrating a suction unit.

As illustrated in FIG. 8, the printing device 11 is, for example, an inkjet-type printer that prints an image such as characters and photographs on a medium such as a sheet by ejecting ink, which is an example of a liquid. The printing device 11 includes the housing 13 and the base 12 that supports the housing 13.

The printing device 11 includes the transport unit 20 that transports the fiber M. The transport unit 20 transports the fiber M along a predetermined transport path. The printing device 11 includes the feeding unit 14 that unwinds and feeds the fiber M from the roll body R1. The feeding unit 14 includes the feeding motor 27 as a drive source thereof. The transport unit 20 transports the fiber M having a long shape and unwound from the roll body R1 by the feeding unit 14.

The printing device 11 includes the liquid ejecting unit 31 that ejects liquid onto the medium M to be transported. The liquid ejecting unit 31 may be mounted on the carriage 32, which is an example of the moving unit. The carriage 32 moves in the width direction X that intersects the transport direction Y of the fiber M in the printing region. Thus, the printing device 11 may be a serial printer in which the liquid ejecting unit 31 moves relative to the fiber M. Note that the printing device 11 may be a line printer constituted by a line head including a plurality of the nozzles 31N capable of ejecting the liquid at once in a range across the entire width direction X of the fiber M.

As illustrated in FIG. 8, the printing device 11 includes the liquid supply unit 45 that supplies liquid to the liquid ejecting unit 31. The liquid supply unit 45 has a configuration basically similar to that in the first exemplary embodiment illustrated in FIG. 3. That is, the liquid supply unit 45 includes the liquid accommodating bodies 41A to 41C, the supply flow path 50, the first temperature adjustment unit 57, and the like. Similar to the first exemplary embodiment, the supply flow path 50 may be configured to include the circulation flow path 50A including the sub-tanks 51, 52, and to circulate a liquid adjusted in temperature by the first temperature adjustment unit 57 through a path passing through the pressure chamber 35 in the liquid ejecting unit 31.

As illustrated in FIG. 8, the printing device 11 includes the winding unit 15 that winds the fiber M after printing. The winding unit 15 includes the winding motor 28 as a drive source thereof.

The liquid ejecting device 11 includes a tension bar 120 that applies tension to the fiber M. The tension bar 120 applies appropriate tension to the fiber M by displacing the fiber M while maintaining a state of contact with the fiber M in a portion between the transport unit 20 and the winding unit 15. The winding unit 15 winds the fiber M, after the printing is completely dried, with tension applied by the tension bar 120.

The printing device 11 includes an upstream support portion 121, a support portion 122, and a downstream support portion 123 that form a transport path for transporting the fiber M. The upstream support portion 121 supports a region of the fiber M before printing. The support portion 122 supports the fiber M in a portion including the printing region facing the liquid ejecting unit 31. The liquid ejecting unit 31 is positioned facing the support portion 122, and ejects liquid onto the printing region, which is the region of the fiber M to be transported being supported by the support portion 122. The downstream support portion 123 supports a region of the fiber M after printing. In the example illustrated in FIG. 8, a transport path having a trapezoidal shape in a side view is formed with an outer surface of the support portion 122 that is horizontal as a top surface and outer surfaces of each of the upstream support portion 121 and the downstream support portion 123 as inclined surfaces.

As illustrated in FIG. 8, the transport unit 20 is a roller transport type, and includes a driving roller 125 and a driven roller 126. The driving roller 125 and the driven roller 126 transport the fiber M by rotating with the fiber M interposed therebetween in a nipped state. The driving roller 125 uses a transport motor (not illustrated) as a power source.

The printing device 11 includes the first detection unit 33 and the second detection unit 34, similarly to the first exemplary embodiment. The first detection unit 33 detects the material of the fiber M at a position upstream of the printing position (printing region). The second detection unit 34 detects the thickness of the fiber M at a position upstream of the printing position (printing region). In the example illustrated in FIG. 8, both detection units 33, 34 are supported in a posture configured to face the front surface of the fiber M being transported to a position near a feeding port of the housing 13.

As illustrated in FIG. 8, the printing device 11 includes the suction unit 130 capable of suctioning the fiber M onto the front surface of the transport unit 20. The suction unit 130 is disposed below the support portion 122, and suctions the fiber M onto the support portion 122 by negative pressure. The suction unit 130 suctions and supports the fiber M on the support part 122 by applying negative pressure to suction holes 135 (refer to FIG. 9) that open to a support face 122A, which is a surface with which the fiber M supported by the support portion 122 is in contact.

Further, as illustrated in FIG. 8, the printing device 11 includes heaters 131, 132, 133 that heat the upstream support portion 121, the support portion 122, and the downstream support portion 123, respectively. Specifically, the pre-heater 131 is provided on a back surface of the upstream support portion 121, the platen heater 132 is provided on a back surface of the support portion 122, and the after-heater 133 is provided on a back surface of the downstream support portion 123. The pre-heater 131 preheats a portion of the fiber M before printing. The platen heater 132 heats a portion of the printing region of the fiber M. The after-heater 133 heats a portion of the fiber M after printing. In this exemplary embodiment, the pre-heater 131 and the platen heater 132 constitute the second temperature adjustment unit 18 that adjusts the surface temperature of the transport unit 20. With the transport surface temperature of the fiber M being adjusted by the second temperature adjustment unit 18, the temperature of the fiber M itself is adjusted until the fiber M after printing reaches the drying unit 19.

As illustrated in FIG. 8, the printing device 11 includes the drying unit 19 that heats the fiber M after printing. The drying unit 19 is positioned facing a portion in the middle of the transport path between the printing position by the liquid ejecting unit 31 and the winding unit 15.

The drying unit 19 includes a heater tube 141, which is a heating element, and a fan 142. The drying unit 19 dries the fiber M after printing by radiant heat from the heater tube 141 and warm air obtained by blowing air heated by the heater tube 141 along the transport path by the fan 142. The drying unit 19 is positioned facing the after-heater 133 with the downstream support portion 123 interposed therebetween. Thus, the fiber M after printing is heated from both the front and back surfaces, promoting the drying of the liquid. The fiber M after printing thus dried is wound as the roll body R2 by the winding unit 15.

The printing device 11 includes the control unit 120. The control unit 100 comprehensively controls the printing device 11. The control unit 100 controls the feeding unit 14, the transport unit 20, the winding unit 15, the liquid ejecting unit 31, the drying unit 19, and the like. The control unit 100 controls the suction unit 130 as a control target so as to match a condition corresponding to the finished state specified by the input operation unit 36.

Configuration of Suction Unit 130

Next, a detailed configuration of the suction unit 130 will be described with reference to FIG. 9. As illustrated in FIG.

9, the support portion 122 includes the suction holes 135 that open to the support face 122A in contact with the fiber M. The printing device 11 includes the suction unit 130 that generates negative for applying a suction force that suctions the fiber M onto the suction holes 135. At a lower portion of the support portion 122, a negative pressure chamber 137 is enclosed and formed by a negative pressure chamber formation member 130A having a cylindrical shape and assembled to the support portion 122 and the support portion 122. The support face 122A includes a plurality of the suction holes 135 communicating with the negative pressure chamber 137. The suction unit 130 includes an exhaust fan 138 that emits air from the suction chamber 137 to the outside. When the exhaust fan 138 is driven, the air in the negative pressure chamber 137 is emitted to the outside, causing negative pressure to form in the negative pressure chamber 137. The fiber M is suctioned onto and supported by the support face 122A by the negative pressure acting on the plurality of suction holes 135.

The plurality of suction holes 135 are in the printing region facing the liquid ejecting unit 31 during printing. The liquid ejected from the nozzles 31N of the liquid ejecting unit 31 and adhered to the front surface of the fiber M is drawn from the suction holes 135 toward the back surface of the fiber M by a suction force acting on the back surface (lower surface) of the fiber M. That is, the suction force acting on the fiber M promotes the soaking of the liquid from the front surface of the fiber M toward the back surface.

A pressure detection unit 139 for detecting pressure is provided in the negative pressure chamber 137. The control unit 100 controls the suction unit 130 so that the pressure in the negative pressure chamber 137 reaches a predetermined set negative pressure value on the basis of the pressure detected by the pressure detection unit 139. In this exemplary embodiment, when the fiber M is transported as well, the negative pressure acts on the suction holes 135, and the suction force suctioning toward the support face 122A is applied to the fiber M during transport. Note that control may be performed so that no negative pressure acts on the suction holes 135 during transport of the fiber M.

Electrical Configuration of Printing Device 11

Figure 10:
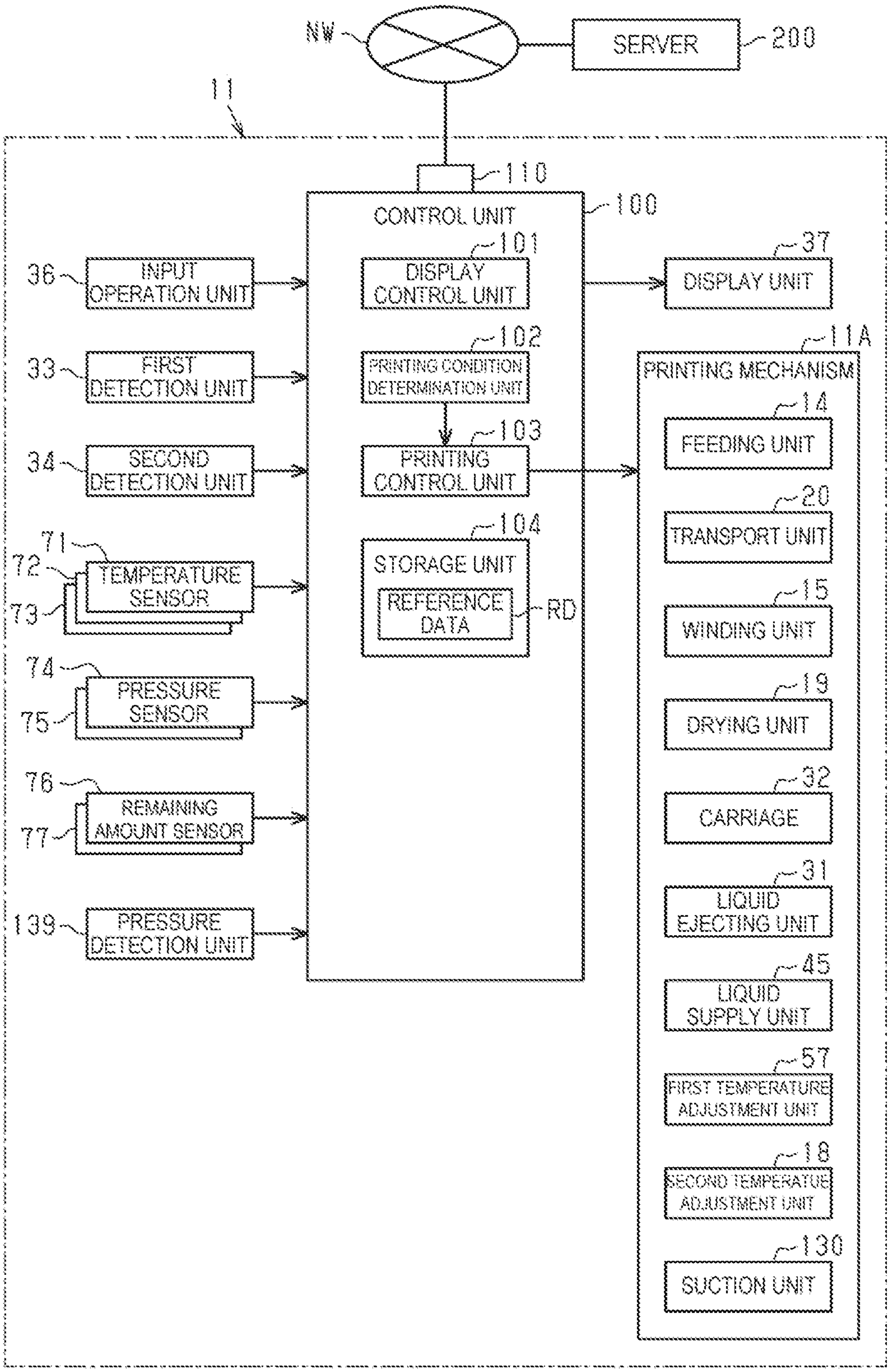
FIG. 10 is a block diagram illustrating an electrical configuration of the printing device.

FIG. 10 illustrates an electrical configuration of the printing device 11 of the second exemplary embodiment. The printing device 11 has the electrical configuration illustrated in FIG. 10. The printing device 11 according to the second exemplary embodiment has a configuration similar to that of the first exemplary embodiment except portions associated with differences in configuration resulting from whether the transport unit 20 is a roller transport type or a belt transport type. The printing device 11 according to the second exemplary embodiment does not include the second temperature adjustment unit 18 that adjusts the temperature of the adhesive layer 25 of the transporting belt 21 in the first exemplary embodiment. The printing device 11 according to the second exemplary embodiment includes the suction unit 130 that applies a suction force for suctioning the fiber M during or immediately after printing from the front surface (back surface) opposite to the printing surface. As illustrated in FIG. 10, the control unit 100 controls the suction unit 130. The control unit 100 drives and controls the exhaust fan 138 of the suction unit 130 so that the detected pressure detected by the pressure detection unit 139 is a target negative pressure. The suction force acting on the back surface of the fiber M in the printing region is one parameter for determining the finished state of the fiber M after printing.

The control unit 100 controls the control target so as to match the "texture" obtained by the user specifying a value by operating the texture selection unit 94 and the "coloration" obtained by the user specifying a value by operating the coloration selection unit 95 on the input screen 90. The printing condition determination unit 102 determines the parameters defining the printing conditions so as to match the finished state (texture, coloration) specified using the input operation unit 36 and the input screen 90 (FIG. 5) constituting an example of the selection unit. The printing condition determination unit 102 determines the plurality of parameters defining the printing conditions by referring to the reference data RDi corresponding to the fiber type at the time, on the basis of the input finished state instruction values (texture instruction value, coloration instruction value).

The plurality of parameters are basically the same as those of the first exemplary embodiment, but there is no adjustment temperature of the second temperature adjustment unit 18 provided in the first exemplary embodiment, and instead there is a suction force of the suction unit 130. The larger the suction force, the more readily the liquid soaks into the fiber M. Therefore, the larger the suction force, the softer the texture, and the lighter the coloration. That is, when the suction force is a first suction force, the texture becomes harder than the texture when the suction force is a second suction force that is greater than the first suction force. Further, when the suction force is the first suction force, the coloration is darker than the coloration when the suction force is the second suction force that is greater than the first suction force.

In the printing device 11, liquid is ejected from the liquid ejecting unit 31, printing an image on the fiber M. During printing, the exhaust fan 138 is driven, and the fiber M receives the suction force from the back surface. The magnitude of the suction force determines the degree to which the liquid ejected from the liquid ejecting unit 31 and adhered to the front surface of the fiber M soaks into the fiber M in the direction of the thickness of the fiber M before drying. The smaller the specified value of the texture (the softer the specified value), the larger the set suction force. The larger the specified coloration (the darker the specified value), the smaller the set suction force. In practice, the value of the suction force, which is one of the plurality of parameters, is determined by the printing condition determination unit 102 referring to the reference data RDi corresponding to the fiber type at this time, on the basis of the specified texture instruction value and coloration instruction value. The value of the suction force is determined by the combination of all values of the plurality of parameters such that the finished state meets each instruction value. That is, the control unit 100 determines the values of the eight parameters of the seven parameters of (a) to (g) indicated in FIG. 7 and the parameter of the suction force added thereto by referencing the reference data RDi on the basis of the texture instruction value and the coloration instruction value.

According to the second exemplary embodiment, the effects (1-1) to (1-9) of the first exemplary embodiment can be similarly obtained, and the effects indicated below can be further obtained.

(2-1) The printing device 11 includes the transport unit 20 that transports the fiber M, and the suction unit 130 capable of suctioning the fiber M onto the front surface of the transport unit 20. The control unit 100 controls the suction unit 130 as a control target so as to match a condition corresponding to the finished state specified by the input operation unit 36. According to this configuration, it is possible to express subtle differences in the finished state even with one type of fiber M.

Note that the above-described exemplary embodiments can be modified into modes such as the following modified examples. Furthermore, further modifications can be made by combining the above-described exemplary embodiments and the following modified examples as appropriate, and further modifications can be made by combining the following modified examples as appropriate.

The control target for obtaining the finished state may be only the first temperature adjustment unit 57.

The control target for obtaining the finished state may be only the second temperature adjustment unit 18.

The control target for obtaining the finished state may be only the transport unit 20.

The control target for obtaining the finished state may be only the liquid ejecting unit 31.

The control target for obtaining the finished state may be only the suction unit 130.

The control target for obtaining the finished state may be at least a plurality of units among the first temperature adjustment unit 57, the second temperature adjustment unit 18, the transport unit 20, the liquid ejecting unit 31, and the suction unit 130. For example, there may be two, there may be three, or there may be four control targets.

As long as the finished state can be selected, the selection unit is not limited to a slide operation type enabling selection of a desired value from among continuous values. The selection unit may be configured as a selection type for selecting one option from a plurality of options, for example. For example, the configuration may be one in which the texture is selected from one of three levels: soft, normal, and hard, and the coloration is selected from one of three levels: light, normal, and dark. Note that the levels are not limited to three, and may be two levels or may be multiple levels of four or more.

The finished state selected by the user may be at least one of texture and coloration. For example, the item available for the user to select as the finished state may be texture only. Further, for example, the item available for the user to select as the finished state may be coloration only. Furthermore, there may be three or more items available for the user to select as a finished state, including items other than and in addition to texture and coloration.

The determination of a parameter value is not limited to determination so as to match a condition corresponding to the combination of the finished state and the fiber type. The control unit 100 may determine a parameter value so as to match a condition corresponding to a selected finish state only without taking into account the fiber type, the material of the fiber M, or the thickness of the fiber M.

The printing condition determination unit 102 is not limited to a configuration in which a parameter is determined with reference to the reference data RD. The printing condition determination unit 102 may include a learning unit or a learned model. The technique of machine learning employed by the learning unit or model may be deep learning. The model is obtained by supervised learning by a learning unit that uses at least one of the texture instruction value and the coloration instruction value as an input value and a plurality of parameters defining printing conditions as output values. The printing condition determination unit 102 inputs a finished state instruction value (at least one of the texture instruction value and the coloration instruction value) selected by the user as an input value, and outputs a plurality of parameters defining conditions corresponding to the finished state as output values.

One detection unit may be configured to detect both the material and the thickness of the fiber M.

The configuration may include only one of the first detection unit 33 and the second detection unit 34. That is, the configuration my include only the first detection unit 33, and the control unit 100 may be configured to control the control target under conditions corresponding to the combination of the finished state and the material of the fiber M. Further, the configuration may include only the second detection unit 34, and the control unit 100 may be configured to control the control target under conditions corresponding to the combination of the finished state and the thickness of the fiber M.

When the transport unit 20 is a belt transport type, the transporting belt 21 is not limited to a glue belt. The belt may be a transporting belt that adsorbs the fiber M onto the support face **21*a*** using an electrostatic adsorption method.

The printing device 11 is not limited to a printing device that performs printing on cloth, and may be a printing device that performs printing on a medium such as a sheet.

The printing device 11 is not limited to a serial printer in which the liquid ejecting unit 31 reciprocates in the width direction X and is not limited to a line printer in which the liquid ejecting unit 31 does not move in the width direction X, and may be a lateral printer in which the liquid ejecting unit 31 can move in the two directions of the width direction X and the transport direction Y.

The printing device 11 may also include a dyeing unit configured to dye the fiber M by immersing the fiber M in a liquid such as ink. Further, the liquid ejecting unit 31 is not limited to an inkjet-type ejecting head, and may be a dispenser that ejects liquid, or the like. Further, the unit may also be a device obtained by combining the liquid ejecting unit 31 and a dyeing unit that drops a liquid such as ink onto the fiber M.

The post-treatment solution may be a coating solution. The pretreatment solution may be a bleed-through prevention treatment solution.

What is claimed is:

1. A printing device comprising:

a liquid ejecting unit configured to eject a liquid and perform printing on fiber transported;

a supply flow path for supplying a liquid accommodated in a liquid accommodating body to the liquid ejecting unit;

a selection unit configured to enable a user to select a finished state of the printed fiber in advance, the finished state including a texture of the printed fiber; and a control unit configured to control a control target so as to match a condition corresponding to the finished state specified by the selection unit.

2. The printing device according to claim 1, further comprising:

a first temperature adjustment unit configured to adjust a temperature of the liquid in the supply flow path, wherein the control unit is configured to control the first temperature adjustment unit as the control target so that a temperature of the liquid in the supply flow path matches a condition corresponding to the finished state specified by the selection unit.

3. The printing device according to claim 1, further comprising a transport unit configured to transport the fiber, wherein the control unit controls a transport velocity of the transport unit as the control target so as to match a condition corresponding to the finished state specified by the selection unit.

4. The printing device according to claim 1, further comprising a transport unit configured to transport the fiber; and a second temperature adjustment unit configured to adjust a surface temperature of the transport unit, wherein the control unit is configured to control the second temperature adjustment unit as the control target so as to match a condition corresponding to the finished state specified by the selection unit.

5. The printing device according to claim 1, further comprising;

a transport unit configured to transport the fiber; and a suction unit configured to suction the fiber onto a surface of the transport unit, wherein the control unit is configured to control the suction unit as the control target so as to match a condition corresponding to the finished state specified by the selection unit.

6. The printing device according to claim 1, further comprising:

a moving unit provided with the liquid ejecting unit and configured to move in a scanning direction, wherein the control unit is configured to control the moving unit as the control target so as to match a condition corresponding to the finished state specified by the selection unit.

7. The printing device according to claim 1, wherein the control unit is configured to control the liquid ejecting unit as the control target so as to match a condition corresponding to the finished state specified by the selection unit.

8. The printing device according to claim 1, further comprising a detection unit configured to detect a state of the fiber, wherein the control unit is configured to control the control target so as to match a condition corresponding to a combination of the finished state selected and the state of the fiber detected.

9. The printing device according to claim 1, further comprising:

an input unit configured to accept an input of a state of the fiber, wherein the control unit is configured to control the control target so as to match a condition corresponding to a combination of the finished state selected and the state of the fiber input.

10. The printing device according to claim 8, wherein the state of the fiber includes at least one of a material of the fiber and a thickness of the fiber.

11. The printing device according to claim 9, wherein the state of the fiber includes at least one of a material of the fiber and a thickness of the fiber.

* * * * *